US010239989B2

(12) United States Patent
Noda et al.

(10) Patent No.: US 10,239,989 B2
(45) Date of Patent: Mar. 26, 2019

(54) CURABLE COMPOSITION

(71) Applicant: TOKYO OHKA KOGYO CO., LTD., Kawasaki-shi (JP)

(72) Inventors: Kunihiro Noda, Kawasaki (JP); Hiroki Chisaka, Kawasaki (JP); Yoshinori Tadokoro, Kawasaki (JP); Dai Shiota, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 0 days.

(21) Appl. No.: 15/533,940

(22) PCT Filed: Dec. 8, 2015

(86) PCT No.: PCT/JP2015/084451
§ 371 (c)(1),
(2) Date: Jun. 7, 2017

(87) PCT Pub. No.: WO2016/093254
PCT Pub. Date: Jun. 16, 2016

(65) Prior Publication Data
US 2017/0327631 A1    Nov. 16, 2017

(30) Foreign Application Priority Data
Dec. 9, 2014    (JP) .................................. 2014-249323

(51) Int. Cl.
| C08G 59/42 | (2006.01) |
| C08L 63/00 | (2006.01) |
| C08G 59/40 | (2006.01) |
| C08G 59/50 | (2006.01) |
| C08G 59/56 | (2006.01) |
| C08J 5/04  | (2006.01) |
| C08G 59/68 | (2006.01) |
| C08K 5/09  | (2006.01) |
| C08K 5/10  | (2006.01) |
| C08G 59/52 | (2006.01) |

(52) U.S. Cl.
CPC ......... *C08G 59/42* (2013.01); *C08G 59/4021* (2013.01); *C08G 59/4223* (2013.01); *C08G 59/50* (2013.01); *C08G 59/5033* (2013.01); *C08G 59/5073* (2013.01); *C08G 59/52* (2013.01); *C08G 59/686* (2013.01); *C08J 5/04* (2013.01); *C08K 5/09* (2013.01); *C08K 5/10* (2013.01); *C08L 63/00* (2013.01); *C08J 2363/00* (2013.01)

(58) Field of Classification Search
CPC ..... C08L 63/00–63/10; C09D 163/00–163/10; C09J 163/00–163/10; C08J 2363/00–2363/10; C08G 59/68; C08G 59/686; C08G 59/5073; C08G 59/42; C08G 59/52; C08K 5/09; C08K 5/10; C08K 5/3445; C07D 233/54
See application file for complete search history.

(56) References Cited

U.S. PATENT DOCUMENTS

| 6,045,898 A * | 4/2000 | Kishi ..................... C08G 59/18 |
| | | 428/292.1 |
| 2003/0149135 A1 | 8/2003 | Morganelli et al. |
| 2013/0217283 A1 | 8/2013 | Arai et al. |
| 2014/0171551 A1 | 6/2014 | Patel et al. |
| 2014/0235757 A1 | 8/2014 | Fukuhara et al. |
| 2017/0247334 A1* | 8/2017 | Ishikawa ............. C07D 233/60 |
| 2018/0194930 A1* | 7/2018 | Noda .................... C08K 5/3445 |
| 2018/0223045 A1* | 8/2018 | Noda ................. C08G 73/1085 |

FOREIGN PATENT DOCUMENTS

| JP | 2005-516115 | 6/2005 |
| JP | 2013-543035 | 11/2013 |
| JP | 2013-253233 | 12/2013 |
| JP | 2014-118576 | 6/2014 |
| JP | 2015-110560 | 6/2015 |
| JP | 2015-214608 | 12/2015 |
| WO | WO 2013/081060 | 6/2013 |

OTHER PUBLICATIONS

Machine translation of JP 2013-253233 A.*

* cited by examiner

*Primary Examiner* — Kregg T Brooks
(74) *Attorney, Agent, or Firm* — Knobbe Martens Olson & Bear LLP

(57) ABSTRACT

A curable composition that can be cured at low temperature in a short time regardless of the type of epoxy compound that is mixed therewith, and has a long pot life; an adhesive comprising said curable composition; a method for producing a fiber-reinforced composite material that uses the curable composition; and a fiber-reinforced composite material containing a matrix comprising the curable composition. A curing agent mixture composition that can be cured at low temperature and in a short time, and provides the curable composition with a long pot life. An epoxy compound (A) and an imidazole compound (B) are blended in with the curable composition. In addition, the imidazole compound (B) and at least one type of crosslinking agent (C) are blended in with the curing agent mixture composition.

13 Claims, No Drawings

CURABLE COMPOSITION

This application is the U.S. National Phase under 35 U.S.C. § 371 of International Application PCT/JP2015/084451, filed Dec. 8, 2015, designating the U.S., and published in Japanese as WO 2016/093254 on Jun. 16, 2016, which claims priority to Japanese Patent Application No. 2014-249323, filed Dec. 9, 2014, the entire contents of which are incorporated herein by reference.

TECHNICAL FIELD

The present invention relates to a curable composition including an (A) epoxy compound and a (B) imidazole compound having a specific structure; an adhesive comprising the curable composition; a method for producing a fiber-reinforced composite material using the curable composition; and a fiber-reinforced composite material comprising a matrix consisting of a cured article of the curable composition, and a reinforcing fiber.

BACKGROUND ART

A curable composition including an epoxy compound, a curing agent, and a curing catalyst has widely been used in various applications such as adhesive applications, sealing applications of various electronic components, and matrix formation applications of fiber-reinforced composite materials.

There has been proposed, as a curable composition containing an epoxy compound to be used in these applications, for example, a curable composition including a (A) tetraglycidylamine type epoxy compound, (B) dicyandiamide, (C) diaminodiphenylsulfone, and a (D) urea compound, wherein viscosities at 40° C. and a curing starting temperature are within a specific range (see Patent Document 1).

Patent Document 1: Japanese Unexamined Patent Application (Translation of PCT Application), Publication No. 2013-543035

DISCLOSURE OF THE INVENTION

Problems to be Solved by the Invention

As mentioned in the Examples of Patent Document 1, the curable composition mentioned in Patent Document 1 is curable at a comparatively low temperature of about 130° C., however, curing of the curable composition requires a long time of about 2 hours.

In sealing applications of various electronic components and the production of the fiber-reinforced composite material, it is desired that the curable composition is sufficiently cured at a low temperature within a short time from the viewpoint of reduction of production cost and safety of an operation. However, the curable composition mentioned in Patent Document 1 cannot meet these requirements.

Usually, a type of an epoxy compound to be mixed in the curable composition is selected from a wide choice of types in consideration of various properties such as transparency, mechanical properties, and chemical resistance of a cured article. On the contrary, the curable composition mentioned in Patent Document 1 also has a problem in that the epoxy compound that can be chosen is limited to a significantly narrow range; namely, a tetraglycidylamine type epoxy compound.

General requirements for a curable composition including an epoxy compound include a long pot life in which properties such as viscosity do not change during long-term storage.

In light of the above problems, the present invention has been made and an object thereof is to provide a curable composition which is curable at a low temperature within a short time regardless of the type of epoxy compound to be mixed, and also exhibits a long pot life; an adhesive comprising the curable composition; a method for producing a fiber-reinforced composite material using the curable composition; and a fiber-reinforced composite material comprising a matrix consisting of the curable composition. It is also an object of the present invention to provide a curing agent mixture composition that gives a curable composition which is curable at a low temperature within a short time, and also exhibits a long pot life.

Means for Solving the Problems

The present inventors have found that the above problems can be solved by mixing an (A) epoxy compound and a (B) imidazole compound having a specific structure in a curable composition, and mixing a (B) imidazole compound having a specific structure and (C) at least one crosslinking agent selected from the group consisting of a polyfunctional amine compound and a polyfunctional carboxylic anhydride in a curing agent mixture composition, and thus the present invention has been completed.

A first aspect of the present invention provides a curable composition comprising an (A) epoxy compound and a (B) imidazole compound represented by the following formula (1):

wherein, in the formula (1), $R^1$ is a hydrogen atom or an alkyl group; $R^2$ is an optionally substituted aromatic group; $R^3$ is an optionally substituted alkylene group; $R^4$ each independently represents a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group; and n is an integer of 0 to 3.

A second aspect of the present invention provides an adhesive comprising the curable composition according to the first aspect.

A third aspect of the present invention provides a method for producing a fiber-reinforced composite material, which comprises curing the curable composition according to the first aspect, in which a reinforcing fiber is impregnated, by heating.

A fourth aspect of the present invention provides a fiber-reinforced composite material comprising a matrix consisting of a cured article of curable composition according to the first aspect, and a reinforcing fiber.

A fifth aspect of the present invention provides a curing agent mixture composition comprising a (B) imidazole compound represented by the following formula (1) and (C) at least one crosslinking agent selected from the group consisting of a polyfunctional amine compound and a polyfunctional carboxylic anhydride:

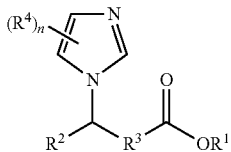
(1)

wherein, in the formula (1), $R^1$ is a hydrogen atom or an alkyl group; $R^2$ is an optionally substituted aromatic group; $R^3$ is an optionally substituted alkylene group; $R^4$ each independently represents a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group; and n is an integer of 0 to 3.

Effects of the Invention

According to the present invention, it is possible to provide a curable composition which is curable at a low temperature within a short time regardless of the type of epoxy compound to be mixed, and also exhibits a long pot life; an adhesive comprising the curable composition; a method for producing a fiber-reinforced composite material using the curable composition; and a fiber-reinforced composite material comprising a matrix consisting of the curable composition. According to the present invention, it is possible to provide a curing agent mixture composition that gives a curable composition which is curable at a low temperature within a short time, and also exhibits a long pot life.

PREFERRED MODE FOR CARRYING OUT THE INVENTION

<<Curable Composition>>

The curable composition includes an (A) epoxy compound and a (B) imidazole compound represented by the following formula (1) (hereinafter also referred to as the (B) imidazole compound). In such a curable composition, use of the (A) epoxy compound in combination with the (B) imidazole compound enables significant acceleration of a curing reaction of the (A) epoxy compound even at a low temperature, for example, about 100 to 160° C. Therefore, such a curable composition gives a cured article having excellent mechanical properties even in the case of curing at a low temperature within a short time:

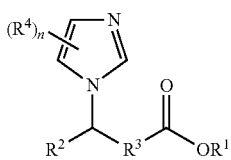
(1)

In the formula (1), $R^1$ is a hydrogen atom or an alkyl group; $R^2$ is an optionally substituted aromatic group; $R^3$ is an optionally substituted alkylene group; $R^4$ each independently represents a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group; and n is an integer of 0 to 3.

The curable composition may further include (C) at least one crosslinking agent selected from the group consisting of a polyfunctional amine compound and a polyfunctional carboxylic anhydride, and a (D) curing accelerator, for the purpose of accelerating the curing reaction.

The curable composition may also include a (S) solvent, for the purpose of adjusting viscosity and coatability. Essential or optional components included in the curable composition will be described in order below.

<(A) Epoxy Compound>

An (A) epoxy compound is not particularly limited as long as it is a compound having an epoxy group. The (A) epoxy compound can be selected from various compounds having an epoxy group, which have conventionally been mixed in the curable composition. The (A) epoxy compound may be either a low-molecular compound having an epoxy group, which is a non-polymer, or a polymer having an epoxy group. Regarding the (A) epoxy compound, a non-polymer having an epoxy group, and a polymer having an epoxy group will be described in order below.

[Non-Polymer Having an Epoxy Group]

The non-polymer having an epoxy group is preferably an aliphatic epoxy compound having no aromatic group, in view of the fact that a cured article to be formed using the curable composition will have excellent mechanical properties. Of aliphatic epoxy compounds, an aliphatic epoxy compound having an alicyclic epoxy group is preferable since it gives a cured article which is excellent in transparency and hardness.

Specific examples of the aliphatic epoxy compound having an alicyclic epoxy group include 2-(3,4-epoxycyclohexyl-5,5-spiro-3,4-epoxy)cyclohexane-meta-dioxane, bis(3,4-epoxycyclohexylmethyl) adipate, bis(3,4-epoxy-6-methylcyclohexylmethyl)adipate, 3,4-epoxy-6-methylcyclohexyl-3',4'-epoxy-6'-methylcyclohexane carboxylate, s-caprolactone-modified 3,4-epoxycyclohexylmethyl-3',4'-epoxycyclohexane carboxylate, trimethylcaprolactone-modified 3,4-epoxycyclohexylmethyl-3',4'-epoxycyclohexane carboxylate, β-methyl-5-valerolactone-modified 3,4-epoxycyclohexylmethyl-3',4'-epoxycyclohexane carboxylate, methylenebis(3,4-epoxycyclohexane), di(3,4-epoxycyclohexylmethyl)ether of ethylene glycol, ethylenebis(3,4-epoxycyclohexane carboxylate), dioctyl epoxycyclohexahydrophthalate, di-2-ethylhexyl epoxycyclohexahydrophthalate, an epoxy resin having a tricyclodecene oxide group, and a compound represented by the following formulae (A1) to (A5). Of these specific examples of the alicyclic epoxy compound, an alicyclic epoxy compound represented by any one of the following formulae (A1) to (A4) is preferable, and an alicyclic epoxy compound represented by formula (A1) or (A2) is more preferable, since it gives a cured article which is excellent in transparency and also has high hardness. These alicyclic epoxy compounds can be used alone, or two or more thereof can be used in combination.

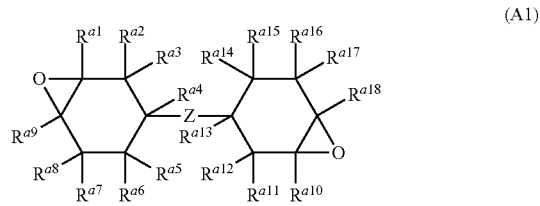
(A1)

In the formula (A1), Z is a single bond, or a divalent group selected from the group consisting of —O—, —O—CO—, —S—, —SO—, —SO$_2$—, —CH$_2$—, —C(CH$_3$)$_2$—, —CBr$_2$—, —C(CBr$_3$)$_2$—, —C(CF$_3$)$_2$—, and —R$^{a19}$—O—CO—; R$^{a19}$ is an alkylene group having 1 to 8 carbon atoms; and R$^{a1}$ to R$^{a18}$ each independently represent a group selected from the group consisting of a hydrogen atom, a halogen atom, and an organic group.

In the formula (A1), R$^{a19}$ is an alkylene group having 1 to 8 carbon atoms, and is preferably a methylene group or an ethylene group.

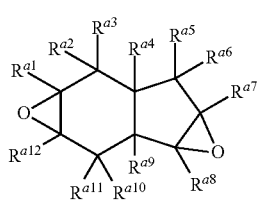
(A2)

In the formula (A2), R$^{a1}$ to R$^{12}$ each independently represents a group selected from the group consisting of a hydrogen atom, a halogen atom, and an organic group. R$^{a2}$ and R$^{a10}$ may be combined to each other.

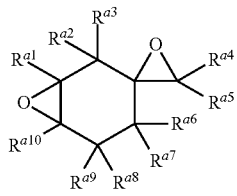
(A3)

In the formula (A3), R$^{a1}$ to R$^{a10}$ each independently represents a group selected from the group consisting of a hydrogen atom, a halogen atom, and an organic group. R$^{a2}$ and R$^{a8}$ may be combined to each other.

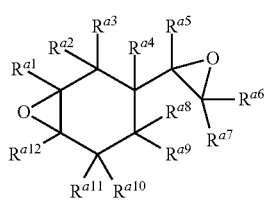
(A4)

In the formula (A4), R$^{a1}$ to R$^{a12}$ each independently represents a group selected from the group consisting of a hydrogen atom, a halogen atom, and an organic group. R$^{a2}$ and R$^{a10}$ may be combined to each other.

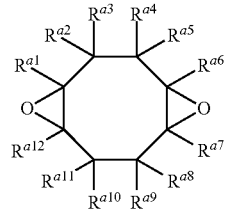
(A5)

In the formula (A5), R$^{a1}$ to R$^{a12}$ each independently represents a group selected from the group consisting of a hydrogen atom, a halogen atom, and an organic group.

In the formula (A1), when R$^{a1}$ to R$^{a18}$ are organic groups, the organic group is not particularly limited as long as the object of the present invention is not impaired, and may be a hydrocarbon group, or a group consisting of a carbon atom and a halogen atom, or a group having heteroatoms such as a halogen atom, an oxygen atom, a sulfur atom, a nitrogen atom, and a silicon atom, together with a carbon atom and a hydrogen atom. Examples of the halogen atom include a chlorine atom, a bromine atom, an iodine atom, and a fluorine atom.

The organic group is preferably a group consisting of a hydrocarbon group, a carbon atom, a hydrogen atom, and an oxygen atom; a group consisting of a halogenated hydrocarbon group, a carbon atom, an oxygen atom, and a halogen atom; and a group consisting of a carbon atom, a hydrogen atom, an oxygen atom, and a halogen atom. When the organic group is a hydrocarbon group, the hydrocarbon group may be an aromatic hydrocarbon group, or an aliphatic hydrocarbon group, or a group including an aromatic skeleton and an aliphatic skeleton. The number of carbon atoms of the organic group is preferably 1 to 20, more preferably 1 to 10, and particularly preferably 1 to 5.

Specific examples of the hydrocarbon group include chain alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethylhexyl group, an n-nonyl group, an n-decyl group, an n-undecyl group, an n-tridecyl group, an n-tetradecyl group, an n-pentadecyl group, an n-hexadecyl group, an n-heptadecyl group, an n-octadecyl group, an n-nonadecyl group, and an n-icosyl group; chain alkenyl groups such as a vinyl group, a 1-propenyl group, a 2-n-propenyl group (allyl group), a 1-n-butenyl group, a 2-n-butenyl group, and a 3-n-butenyl group; cycloalkyl groups such as a cyclopropyl group, a cyclobutyl group, a cyclopentyl group, a cyclohexyl group, and a cycloheptyl group; aryl groups such as a phenyl group, an o-tolyl group, an m-tolyl group, a p-tolyl group, an α-naphthyl group, a β-naphthyl group, a biphenyl-4-yl group, a biphenyl-3-yl group, a biphenyl-2-yl group, an anthryl group, and a phenanthryl group; and aralkyl groups such as a benzyl group, a phenethyl group, an α-naphthylmethyl group, a β-naphthylmethyl group, an α-naphthylethyl group, and a β-naphthylethyl group.

Specific examples of the halogenated hydrocarbon group include halogenated chain alkyl groups such as a chloromethyl group, a dichloromethyl group, a trichloromethyl group, a bromomethyl group, a dibromomethyl group, a tribromomethyl group, a fluoromethyl group, a difluoromethyl group, a trifluoromethyl group, a 2,2,2-trifluoroethyl group, a pentafluoroethyl group, a heptafluoropropyl group, a perfluorobutyl group, and a perfluoropentyl group, a perfluorohexyl group, a perfluoroheptyl group, a perfluorooctyl group, a perfluorononyl group, and a perfluorodecyl group; halogenated cycloalkyl groups such as a 2-chlorocyclohexyl group, a 3-chlorocyclohexyl group, a 4-chlorocyclohexyl group, a 2,4-dichlorocyclohexyl group, a 2-bromocyclohexyl group, a 3-bromocyclohexyl group, and a 4-bromocyclohexyl group; halogenated aryl groups such as a 2-chlorophenyl group, a 3-chlorophenyl group, a 4-chlorophenyl group, a 2,3-dichlorophenyl group, a 2,4-dichlorophenyl group, a 2,5-dichlorophenyl group, a 2,6-dichlorophenyl group, a 3,4-dichlorophenyl group, a 3,5-dichlorophenyl group, a 2-bromophenyl group, a 3-bromophenyl group, a 4-bromophenyl group, a 2-fluorophenyl group, a 3-fluorophenyl group, and a 4-fluorophenyl group; and halogenated aralkyl groups such as a 2-chlorophenylmethyl group, a 3-chlorophenylmethyl group, a 4-chlorophenylmethyl group, a 2-bromophenylmethyl group, a 3-bromophenylmethyl group, a 4-bromophenylmethyl group, a 2-fluorophenylmethyl group, a 3-fluorophenylmethyl group, and a 4-fluorophenylmethyl group.

Specific examples of the group consisting of a carbon atom, a hydrogen atom, and an oxygen atom include hydroxy chain alkyl groups such as a hydroxymethyl group, a 2-hydroxyethyl group, a 3-hydroxy-n-propyl group, and a 4-hydroxy-n-butyl group; halogenated cycloalkyl groups such as a 2-hydroxycyclohexyl group, a 3-hydroxycyclohexyl group, and a 4-hydroxycyclohexyl group; hydroxyaryl groups such as a 2-hydroxyphenyl group, a 3-hydroxyphenyl group, a 4-hydroxyphenyl group, a 2,3-dihydroxyphenyl group, a 2,4-dihydroxyphenyl group, a 2,5-dihydroxyphenyl group, a 2,6-dihydroxyphenyl group, a 3,4-dihydroxyphenyl group, and a 3,5-dihydroxyphenyl group; hydroxyaralkyl groups such as a 2-hydroxyphenylmethyl group, a 3-hydroxyphenylmethyl group, and a 4-hydroxyphenylmethyl group; chain alkoxy groups such as a methoxy group, an ethoxy group, an n-propoxy group, an isopropoxy group, an n-butyloxy group, an isobutyloxy group, a sec-butyloxy group, a tert-butyloxy group, an n-pentyloxy group, an n-hexyloxy group, an n-heptyloxy group, an n-octyloxy group, a 2-ethylhexyloxy group, an n-nonyloxy group, an n-decyloxy group, an n-undecyloxy group, an n-tridecyloxy group, an n-tetradecyloxy group, an n-pentadecyloxy group, an n-hexadecyloxy group, an n-heptadecyloxy group, an n-octadecyloxy group, an n-nonadecyloxy group, and an n-icosyloxy group; chain alkenyloxy groups such as a vinyloxy group, a 1-propenyloxy group, a 2-n-propenyloxy group (allyloxy group), a 1-n-butenyloxy group, a 2-n-butenyloxy group, and a 3-n-butenyloxy group; aryloxy groups such as a phenoxy group, an o-tolyloxy group, an m-tolyloxy group, a p-tolyloxy group, an α-naphthyloxy group, a β-naphthyloxy group, a biphenyl-4-yloxy group, a biphenyl-3-yloxy group, a biphenyl-2-yloxy group, an anthryloxy group, and a phenanthryloxy group; aralkyloxy groups such as a benzyloxy group, a phenethyloxy group, an α-naphthylmethyloxy group, a β-naphthylmethyloxy group, an α-naphthylethyloxy group, and a β-naphthylethyloxy group; alkoxyalkyl groups such as a methoxymethyl group, an ethoxymethyl group, an n-propoxymethyl group, a 2-methoxyethyl group, a 2-ethoxyethyl group, a 2-n-propoxyethyl group, a 3-methoxy-n-propyl group, a 3-ethoxy-n-propyl group, a 3-n-propoxy-n-propyl group, a 4-methoxy-n-butyl group, a 4-ethoxy-n-butyl group, and a 4-n-propoxy-n-butyl group; alkoxyalkoxy groups such as a methoxymethoxy group, an ethoxymethoxy group, an n-propoxymethoxy group, a 2-methoxyethoxy group, a 2-ethoxyethoxy group, a 2-n-propoxyethoxy group, a 3-methoxy-n-propoxy group, a 3-ethoxy-n-propoxy group, a 3-n-propoxy-n-propoxy group, a 4-methoxy-n-butyloxy group, a 4-ethoxy-n-butyloxy group, and a 4-n-propoxy-n-butyloxy group; alkoxyaryl groups such as a 2-methoxyphenyl group, a 3-methoxyphenyl group, and a 4-methoxyphenyl group; alkoxyaryloxy groups such as a 2-methoxyphenoxy group, a 3-methoxyphenoxy group, and a 4-methoxyphenoxy group; aliphatic acyl groups such as a formyl group, an acetyl group, a propionyl group, a butanoyl group, a pentanoyl group, a hexanoyl group, a heptanoyl group, an octanoyl group, a nonanoyl group, and a decanoyl group; aromatic acyl groups such as a benzoyl group, an α-naphthoyl group, and a β-naphthoyl group; chain alkyloxycarbonyl groups such as a methoxycarbonyl group, an ethoxycarbonyl group, an n-propoxycarbonyl group, an n-butyloxycarbonyl group, an n-pentyloxycarbonyl group, an n-hexylcarbonyl group, an n-heptyloxycarbonyl group, an n-octyloxycarbonyl group, an n-nonyloxycarbonyl group, and an n-decyloxycarbonyl group; aryloxycarbonyl groups such as a phenoxycarbonyl group, an α-naphthoxycarbonyl group, and a β-naphthoxycarbonyl group; aliphatic acyloxy groups such as a formyloxy group, an acetyloxy group, a propionyloxy group, a butanoyloxy group, a pentanoyloxy group, a hexanoyloxy group, a heptanoyloxy group, an octanoyloxy group, a nonanoyloxy group, and a decanoyloxy group; and aromatic acyloxy groups such as a benzoyloxy group, an α-naphthoyloxy group, and a β-naphthoyloxy group.

$R^{a1}$ to $R^{a18}$ are preferably each independently a group selected from the group consisting of a hydrogen atom, a halogen atom, an alkyl group having 1 to 5 carbon atoms, and an alkoxy group having 1 to 5 carbon atoms and, particularly, all $R^{a1}$ to $R^{a18}$ are more preferably hydrogen atoms in view of the fact that a cured article obtained by using a curable composition has excellent mechanical properties.

In the formulas (A2) to (A5), $R^{a1}$ to $R^{a12}$ are the same as $R^{a1}$ to $R^{a12}$ in the formula (A1). In the formula (A2) and the formula (A4), the divalent group formed when $R^{a2}$ and $R^{a10}$ are combined to each other includes, for example, —$CH_2$— and —$C(CH_3)_2$—. In the formula (A3), the divalent group formed when $R^{a2}$ and $R^{a8}$ are combined to each other includes, for example, —$CH_2$— and —$C(CH_3)_2$—.

Specific examples of a suitable compound for the alicyclic epoxy compounds represented by the formula (A1) include the following compounds 1 and 2.

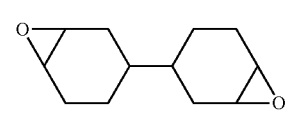

Compound 1

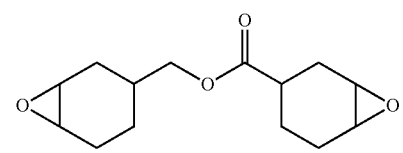

Compound 2

Compound

Of alicyclic epoxy compounds represented by the formula (A2), specific examples of suitable compound include bicyclononadiene diepoxide, dicyclononadiene diepoxide, and the like. Of alicyclic epoxy compound represented by the formula (A3), specific examples of suitable compound include S-spiro[3-oxatricyclo[3.2.1.0$^{2,4}$]octane-6,2'-oxirane], and the like. Of alicyclic epoxy compound represented by the formula (A4), specific examples of suitable compound include 4-vinylcyclohexene dioxide, dipentene dioxide, limonene dioxide, 1-methyl-4-(3-methyloxirane-2-yl)-7-oxabicyclo[4.1.0]heptane, and the like. Of alicyclic epoxy compound represented by the formula (A5), specific examples of suitable compound include 1,2,5,6-diepoxycyclooctane, and the like.

Examples of the non-polymer having an epoxy group other than the above-described aliphatic epoxy compound having an alicyclic epoxy group, which can be used as the (A) epoxy compound, include epoxyalkyl (meth)acrylates such as glycidyl (meth)acrylate, 2-methylglycidyl (meth)acrylate, 3,4-epoxybutyl (meth)acrylate, and 6,7-epoxyheptyl (meth)acrylate; epoxyalkyloxyalkyl (meth)acrylates such as 2-glycidyloxyethyl (meth)acrylate, 3-glycidyloxy-n-propyl (meth)acrylate, 4-glycidyloxy-n-butyl (meth) acrylate, 5-glycidyloxy-n-hexyl (meth) acrylate, and 6-glycidyloxy-n-hexyl (meth) acrylate; difunctional epoxy resins such as a bisphenol A type epoxy resin, a bisphenol F type epoxy resin, a bisphenol S type epoxy resin, a bisphenol AD type epoxy resin, a naphthalene type epoxy resin, and a biphenyl type epoxy resin; novolak epoxy resins such as a phenol novolak type epoxy resin, a brominated phenol novolak type epoxy resin, an orthocresol novolak type epoxy resin, a bisphenol A novolak type epoxy resin, and a bisphenol AD novolak type epoxy resin; cyclic aliphatic epoxy resins such as an epoxidized material of a dicyclopentadiene type phenol resin; aromatic epoxy resins such as an epoxidized material of a naphthalene type phenol resin; epoxy group-containing fluorene compounds such as 9,9-bis[4-(glycidyloxy)phenyl]-9H-fluorene, 9,9-bis[4-[2-(glycidyloxy)ethoxy]phenyl]-9H-fluorene, 9,9-bis[4-[2-(glycidyloxy)ethyl]phenyl]-9H-fluorene, 9,9-bis[4-(glycidyloxy)-3-methylphenyl]-9H-fluorene, 9,9-bis[4-(glycidyloxy)-3,5-dimethylphenyl]-9H-fluorene, and 9,9-bis(6-glycidyloxynaphthalen-2-yl)-9H-fluorene; glycidyl ester type epoxy resins such as a dimer acid glycidyl ester and a triglycidyl ester; glycidylamine type epoxy resins such as tetraglycidyl aminodiphenylmethane, triglycidyl-p-aminophenol, tetraglycidyl metaxylylenediamine, and tetraglycidyl bisaminomethylcyclohexane; heterocyclic epoxy resins such as triglycidyl isocyanurate; trifunctional type epoxy resins such as phloroglucinol triglycidyl ether, trihydroxybiphenyl triglycidyl ether, trihydroxyphenylmethane triglycidyl ether, glycerin triglycidyl ether, 2-[4-(2,3-epoxypropoxy)phenyl]-2-[4-[1,1-bis[4-(2,3-epoxypropoxy)phenyl]ethyl]phenyl]propane, and 1,3-bis[4-[1-[4-(2,3-epoxypropoxy)phenyl]-1-[4-[1-[4-(2,3-epoxypropoxy)phenyl]-1-methylethyl]phenyl]ethyl]phenoxy]-2-propanol; tetrafunctional type epoxy resins such as tetrahydroxyphenylethane tetraglycidyl ether, tetraglycidylbenzophenone, bisresorcinol tetraglycidyl ether, and tetraglycidoxybiphenyl; and a 1,2-epoxy-4-(2-oxiranyl)cyclohexane adduct of 2,2-bis(hydroxymethyl)-1-butanol. The 1,2-epoxy-4-(2-oxiranyl)cyclohexane adduct of 2,2-bis(hydroxymethyl)-1-butanol is commercially available as EHPE-3150 (manufactured by Daicel Corporation).

[Polymer Having an Epoxy Group]

The polymer having an epoxy group may be either a polymer obtained by polymerizing a monomer having an epoxy group or a monomer mixture containing a monomer having an epoxy group, or a polymer obtained by introducing an epoxy group into a polymer having a functional group with reactivity, such as a hydroxyl group, a carboxyl group, or an amino group, using a compound having an epoxy group, for example, epichlorohydrin. It is also possible to suitably use, as the polymer having an epoxy group, a partial oxide of a polymer having an unsaturated aliphatic hydrocarbon group in a side chain, such as 1,2-polybutadiene. Such a partial oxide has an epoxy group formed by oxidation of an unsaturated bond contained in a side chain.

Because of ease of availability, preparation, and adjustment of the amount of epoxy groups in the polymer, the polymer having an epoxy group is preferably a polymer obtained by polymerizing a monomer having an epoxy group or a monomer mixture containing a monomer having an epoxy group, and a partial oxide of a polymer having an unsaturated aliphatic hydrocarbon group in a side chain.

(Polymer of Monomer Having an Epoxy Group or Monomer Mixture Including Monomer Having an Epoxy Group)

In view of ease of preparation and coatability of a curable composition onto a base material, the polymer having an epoxy group is preferably a homopolymer of a (meth)acrylic acid ester having an epoxy group, or a copolymer of a (meth)acrylic acid ester having an epoxy group with the other monomer.

The (meth)acrylic acid ester having an epoxy group may be either a chain aliphatic (meth)acrylic acid ester having an epoxy group, or the below-mentioned (meth)acrylic acid ester having an alicyclic epoxy group. The (meth)acrylic acid ester having an epoxy group may have an aromatic group. In view of transparency of a cured article formed using a curable composition, the (meth)acrylic acid ester having an epoxy group is preferably an aliphatic (meth)acrylic acid ester having a chain aliphatic epoxy group or an aliphatic (meth)acrylic acid ester having an alicyclic epoxy group, and more preferably an aliphatic (meth)acrylic acid ester having an alicyclic epoxy group.

Examples of the (meth)acrylic acid ester, which has an aromatic group and an epoxy group, include 4-glycidyloxyphenyl (meth)acrylate, 3-glycidyloxyphenyl (meth)acrylate, 2-glycidyloxyphenyl (meth) acrylate, 4-glycidyloxyphenylmethyl (meth)acrylate, 3-glycidyloxyphenylmethyl (meth) acrylate, and 2-glycidyloxyphenylmethyl (meth) acrylate.

Examples of the aliphatic (meth)acrylic acid ester having a chain aliphatic epoxy group include (meth)acrylic acid esters in which a chain aliphatic epoxy group is combined with an oxy group (—O—) in an ester group (—O—CO—), such as epoxyalkyl (meth)acrylate and epoxyalkyloxyalkyl (meth)acrylate. Such a chain aliphatic epoxy group possessed by the (meth)acrylic acid ester may have one or plural oxy group(s) (—O—) in a chain. The number of carbon atoms of the chain aliphatic epoxy group is not particularly limited, and is preferably 3 to 20, more preferably 3 to 15, and particularly preferably 3 to 10.

Specific examples of the aliphatic (meth)acrylic acid ester having a chain aliphatic epoxy group include epoxyalkyl (meth)acrylates such as glycidyl (meth)acrylate, 2-methyl glycidyl (meth)acrylate, 3,4-epoxybutyl (meth)acrylate, and 6,7-epoxyheptyl (meth) acrylate; and epoxyalkyloxyalkyl (meth)acrylates such as 2-glycidyloxyethyl (meth)acrylate, 3-glycidyloxy-n-propyl (meth) acrylate, 4-glycidyloxy-n-butyl (meth)acrylate, 5-glycidyloxy-n-hexyl (meth)acrylate, and 6-glycidyloxy-n-hexyl (meth) acrylate.

Specific examples of the aliphatic (meth)acrylic acid ester having an alicyclic epoxy group include compounds represented by the following formulae (a2-1) to (a2-15). Of these compounds, compounds represented by the following formulae (a2-1) to (a2-5) are preferable, and compounds represented by the following formulae (a2-1) to (a2-3) are more preferable.

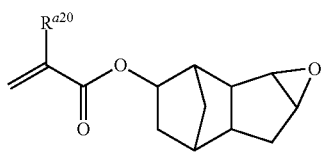
(a2-1)
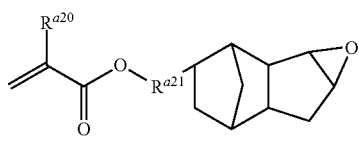
(a2-2)
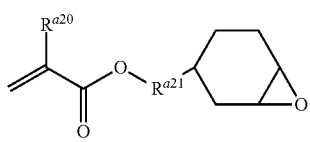
(a2-3)
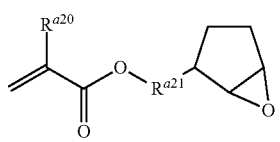
(a2-4)
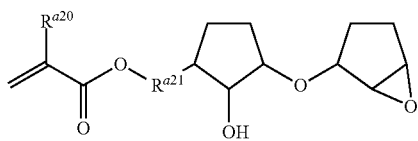
(a2-5)
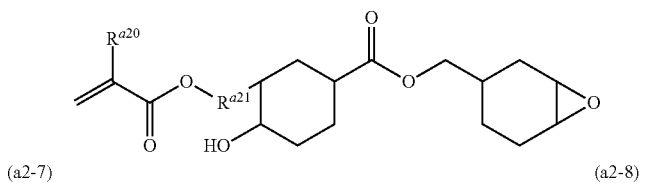
(a2-6)
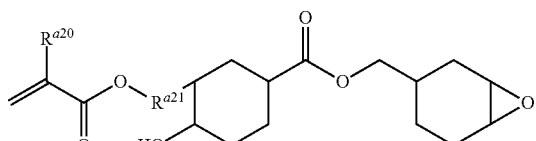
(a2-7)
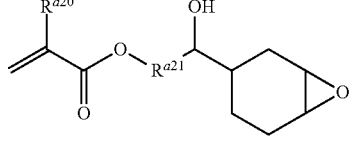
(a2-8)
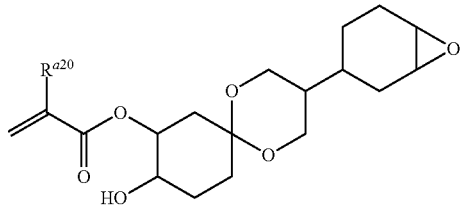
(a2-9)
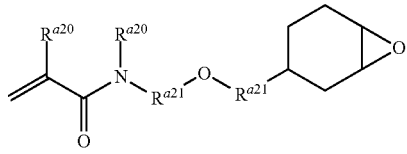
(a2-10)
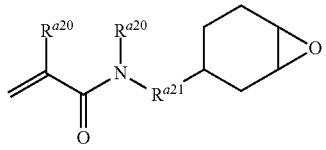
(a2-11)
(a2-12)
(a2-13)
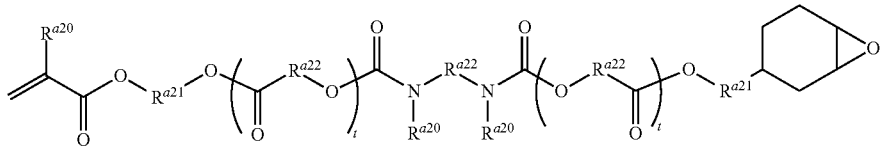
(a2-14)
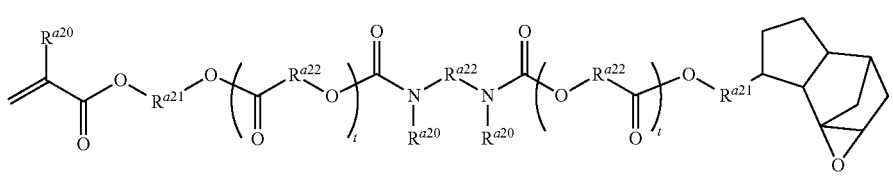
(a2-15)

In the above formulae, $R^{a20}$ represents a hydrogen atom or a methyl group; $R^{a21}$ represents a divalent aliphatic saturated hydrocarbon group having 1 to 6 carbon atoms; $R^{a22}$ represents a divalent hydrocarbon group having 1 to 10 carbon atoms; and t represents an integer of 0 to 10. $R^{a21}$ is a linear or branched alkylene group and is preferably, for example, a methylene group, an ethylene group, a propylene group, a tetramethylene group, an ethylethylene group, a pentamethylene group, or a hexamethylene group. $R^{a22}$ is preferably, for example, a methylene group, an ethylene group, a propylene group, a tetramethylene group, an ethylethylene group, a pentamethylene group, a hexamethylene group, a phenylene group, or a cyclohexylene group.

It is possible to use, as the polymer having an epoxy group, both of a homopolymer of a (meth)acrylic acid ester having an epoxy group, and a copolymer of a (meth)acrylic acid ester having an epoxy group with the other monomer. The content of a unit derived from the (meth)acrylic acid ester having an epoxy group in the polymer having an epoxy group is for example 50% by mass or more, preferably 70% by mass or more, more preferably 80% by mass or more, particularly preferably 90% by mass or more, and most preferably 100% by mass.

When the polymer having an epoxy group is a copolymer of the (meth)acrylic acid ester having an epoxy group with the other monomer, examples of the other monomer include an unsaturated carboxylic acid, a (meth)acrylic acid ester having no epoxy group, (meth)acrylamides, an allyl compound, vinyl ethers, vinyl esters, styrenes, and the like. These compounds can be used alone, or two or more thereof can be used in combination. In view of storage stability of a curable composition, and chemical resistance of a cured article formed using the curable composition against alkali, it is preferred that the copolymer of the (meth)acrylic acid ester having an epoxy group with the other monomer does not include a unit derived from an unsaturated carboxylic acid.

Examples of the unsaturated carboxylic acid include (meth)acrylic acid; (meth)acrylic acid amide; crotonic acid; maleic acid, fumaric acid, citraconic acid, mesaconic acid, itaconic acid, and anhydrides of these dicarboxylic acids.

Examples of the (meth)acrylic acid ester having no epoxy group include linear or branched alkyl (meth)acrylates such as methyl (meth)acrylate, ethyl (meth)acrylate, propyl (meth)acrylate, amyl (meth)acrylate, and t-octyl (meth)acrylate; chloroethyl (meth)acrylate, 2,2-dimethylhydroxypropyl (meth) acrylate, 2-hydroxyethyl (meth)acrylate, trimethylolpropane mono(meth)acrylate, benzyl (meth)acrylate, furfuryl (meth)acrylate; and a (meth)acrylic acid ester having a group with an alicyclic skeleton. Of (meth)acrylic acid esters having no epoxy group, a (meth)acrylic acid ester having a group with an alicyclic skeleton is preferable in view of transparency of a cured article formed using a curable composition.

In a (meth)acrylic acid ester having a group with an alicyclic skeleton, an alicyclic group composing the alicyclic skeleton may be either monocyclic or polycyclic. Examples of the monocyclic alicyclic group include a cyclopentyl group, a cyclohexyl group, and the like. Examples of the polycyclic alicyclic group include a norbornyl group, an isobornyl group, a tricyclononyl group, a tricyclodecyl group, a tetracyclododecyl group, and the like.

Examples of the (meth)acrylic acid ester having a group with an alicyclic skeleton include compounds represented by the following formulae (a3-1) to (a3-8). Of these compounds, compounds represented by the following formulae (a3-3) to (a3-8) are preferable, and compounds represented by the following formulae (a3-3) or (a3-4) are more preferable.

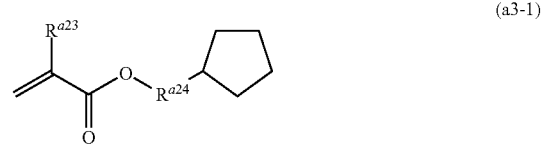

(a3-1)

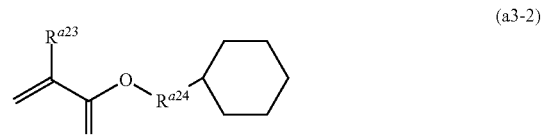

(a3-2)

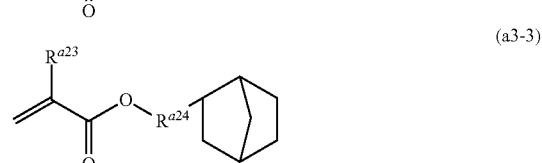

(a3-3)

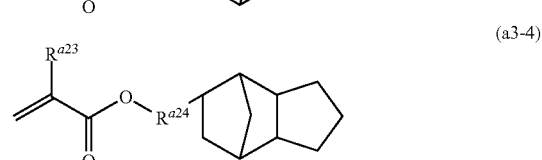

(a3-4)

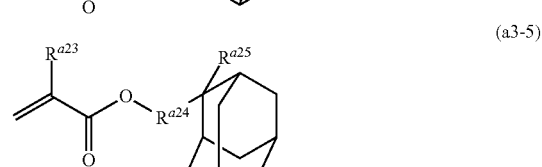

(a3-5)

(a3-6)

(a3-7)

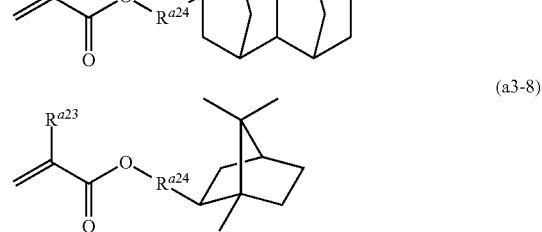

(a3-8)

In the above formulae, $R^{a23}$ represents a hydrogen atom or a methyl group; $R^{a24}$ represents a single bond or a divalent aliphatic saturated hydrocarbon group having 1 to 6 carbon atoms; and $R^{a25}$ represents a hydrogen atom or an alkyl group having 1 to 5 carbon atoms. $R^{a24}$ is preferably a single bond, or a linear or branched alkylene group, for example, a methylene group, an ethylene group, a propylene group, a tetramethylene group, an ethylethylene group, a pentamethylene group, or a hexamethylene group. $R^{a25}$ is preferably a methyl group or an ethyl group.

Examples of (meth)acrylamides include (meth)acrylamide, N-alkyl(meth)acrylamide, N-aryl(meth)acrylamide, N,N-dialkyl(meth)acrylamide, N,N-aryl(meth)acrylamide, N-methyl-N-phenyl(meth)acrylamide, N-hydroxyethyl-N-methyl(meth)acrylamide, and the like.

Examples of the allyl compound include allyl esters such as allyl acetate, allyl caproate, allyl caprylate, allyl laurate, allyl palmitate, allyl stearate, allyl benzoate, allyl acetoacetate, and allyl lactate; allyloxyethanol, and the like.

Examples of vinyl ethers include alkyl vinyl ethers such as hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, and tetrahydrofurfuryl vinyl ether; vinylaryl ethers such as vinyl phenyl ether, vinyl tolyl ether, vinyl chlorophenyl ether, vinyl-2,4-dichlorophenyl ether, vinyl naphthyl ether, and vinyl anthranyl ether; and the like.

Examples of vinyl esters include vinyl butyrate, vinyl isobutyrate, vinyl trimethyl acetate, vinyl diethyl acetate, vinyl valerate, vinyl caproate, vinyl chloroacetate, vinyl dichloroacetate, vinyl methoxyacetate, vinyl butoxyacetate, vinyl phenylacetate, vinyl acetoacetate, vinyl lactate, vinyl-β-phenyl butyrate, vinyl benzoate, vinyl salicylate, vinyl chlorobenzoate, vinyl tetrachlorobenzoate, vinyl naphthoate, and the like.

Examples of styrenes include styrene; alkylstyrenes such as methylstyrene, dimethylstyrene, trimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, and acetoxymethylstyrene; alkoxystyrenes such as methoxystyrene, 4-methoxy-3-methylstyrene, and dimethoxystyrene; halostyrenes such as chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, and 4-fluoro-3-trifluoromethylstyrene; and the like.

(Partial Oxide of Polymer Having Unsaturated Aliphatic Hydrocarbon Group in Side Chain)

The polymer having an unsaturated aliphatic hydrocarbon in a side chain is not particularly limited, and is preferably 1,2-polybutadiene having a vinyl group in a side chain in view of ease of availability and synthesis. An epoxidized polybutadiene having an oxiranyl group and a vinyl group in a side chain can be obtained by partially oxidizing 1,2-polybutadiene. The proportion of the oxiranyl group in the epoxidized polybutadiene is preferably 10 to 70 mol %, more preferably 10 to 50 mol %, and still more preferably 10 to 40 mol %, based on the total number of mols of the oxiranyl group and the vinyl group. It is possible to suitably use, as the epoxidized polybutadiene, JP-100 and JP-200 which are commercially available from NIPPON SODA CO., LTD.

The molecular weight of the above-described polymer having an epoxy group is not particularly limited as long as the object of the present invention is not impaired, and is preferably 3,000 to 30,000, and more preferably 5,000 to 15,000, in terms of a polystyrene-equivalent weight average molecular weight.

The content of the (A) epoxy compound in the curable composition is preferably 40 to 80% by mass, and more preferably 45 to 70% by mass based on the total of the mass of components other than the (S) solvent in the curable composition.

<(B) Imidazole Compound>

The curable composition essentially includes, as a component which enables curing of an (A) epoxy compound, an imidazole compound represented by the following formula (1). Therefore, the curable composition includes the (B) imidazole compound, thus giving a cured article having excellent mechanical properties even in the case of curing at a low temperature, for example, about 100 to 160° C. within a short time.

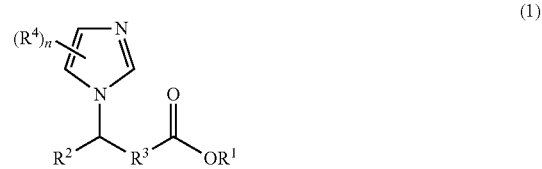

(1)

In the formula (1), $R^1$ is a hydrogen atom or an alkyl group; $R^2$ is an optionally substituted aromatic group; $R^3$ is an optionally substituted alkylene group; $R^4$ is a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group; and n is an integer of 0 to 3.

In the formula (1), $R^1$ is a hydrogen atom or an alkyl group. When $R^1$ is an alkyl group, the alkyl group may be either a linear alkyl group or a branched alkyl group. The number of carbon atoms of the alkyl group is not particularly limited, but is preferably 1 to 20, more preferably 1 to 10, and still more preferably 1 to 5.

Specific examples of the alkyl group suitable as $R^1$ include a methyl group, an ethyl group, an n-propyl group, an isopropyl group, an n-butyl group, an isobutyl group, an sec-butyl group, a tert-butyl group, an n-pentyl group, an isopentyl group, a tert-pentyl group, an n-hexyl group, an n-heptyl group, an n-octyl group, a 2-ethyl-n-hexyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-icosyl group.

In the formula (1), $R^2$ is an optionally substituted aromatic group. The optionally substituted aromatic group may be either an optionally substituted aromatic hydrocarbon group or an optionally substituted aromatic heterocyclic group.

The type of the aromatic hydrocarbon group is not particularly limited without interfering with the object of the present invention. The aromatic hydrocarbon group may be a monocyclic aromatic group, may be formed by fusion of two or more aromatic hydrocarbon groups, or may be formed by bonding of two or more aromatic hydrocarbon groups through a single bond. The aromatic hydrocarbon group is preferably a phenyl group, a naphthyl group, a biphenylyl group, an anthryl group, or a phenanthrenyl group.

The type of the aromatic heterocyclic group is not particularly limited without interfering with the object of the present invention. The aromatic heterocyclic group may be either a monocyclic group or a polycyclic group. The aromatic heterocyclic group is preferably a pyridyl group, a furyl group, a thienyl group, an imidazolyl group, a pyrazolyl group, an oxazolyl group, a thiazolyl group, an isoxazolyl group, an isothiazolyl group, a benzoxazolyl group, a benzothiazolyl group, and a benzoimidazolyl group.

Examples of the substituent, which a phenyl group, a polycyclic aromatic hydrocarbon group, or an aromatic heterocyclic group may have, include a halogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, and an organic group. When the phenyl group, the polycyclic aromatic hydrocarbon group, or the aromatic heterocyclic group have plural substituents, the plural substituents may be the same or different.

When the substituent, which the aromatic group has, is an organic group, examples of the organic group include an alkyl group, an alkenyl group, a cycloalkyl group, a cycloalkenyl group, an aryl group, an aralkyl group, or the like. This organic group may have a bond or a substituent, other than a hydrocarbon group such as a heteroatom, in the organic group. This organic group may be either linear, branched, or cyclic. This organic group is usually monovalent, but can be a divalent or higher polyvalent organic group when forming a cyclic structure.

When the aromatic group has a substituent on neighboring carbon atoms, two substituents bonded on neighboring carbon atoms may be bonded to form a cyclic structure. Examples of the cyclic structure include an aliphatic hydrocarbon ring, and an aliphatic ring having a heteroatom.

When the substituent, which the aromatic group has, is an organic group, the bond included in the organic group is not particularly limited, without impairing the effect of the present invention; and the organic group may include a bond having a heteroatom such as an oxygen atom, a nitrogen atom, or a silicon atom. Specific examples of the bonded containing a heteroatom include, an ether bond, a thioether bond, a carbonyl bond, a thiocarbonyl bond, a ester bond, a amide bond, a urethane bond, an imino bond (—N=C(—R)—, —C(=NR)—: R represents a hydrogen atom or a monovalent organic group), a carbonate bond, a sulfonyl bond, a sulfinyl bond, an azo bond, and the like.

From the viewpoint of heat resistance of the imidazole compound represented by the formula (1), the bond containing a heteroatom, which an organic group may have, is preferably an ether bond, a thioether bond, a carbonyl bond, a thiocarbonyl bond, an ester bond, an amide bond, an amino bond (—NR—: R represents a hydrogen atom or a monovalent organic group), an urethane bond, an imino bond (—N=C(—R)—, —C(=NR)—: R represents a hydrogen atom or a monovalent organic group), a carbonate bond, a sulfonyl bond, or a sulfinyl bond.

When the organic group is a substituent other than the hydrocarbon group, the type of the substituent other than the hydrocarbon group is not particularly limited without interfering with the object of the present invention. Specific examples of the substituent other than the hydrocarbon group include a halogen atom, a hydroxy group, a mercapto group, a sulfide group, a cyano group, an isocyano group, a cyanato group, an isocyanato group, a thiocyanato group, an isothiocyanato group, an silyl group, an silanol group, an alkoxy group, an alkoxycarbonyl group, an amino group, a monoalkylamino group, a dialkylamino group, a monoarylamino group, a diarylamino group, a carbamoyl group, a thiocarbamoyl group, a nitro group, a nitroso group, a carboxylate group, an acyl group, an acyloxy group, a sulfino group, a sulfonato group, a phosphino group, a phosphinyl group, a phosphonato group, an alkyl ether group, an alkenyl ether group, an alkyl thioether group, an alkenyl thioether group, an aryl ether group, an aryl thioether group, and the like. The hydrogen atom included in the substituent mentioned above may be substituted with a hydrocarbon group. The hydrocarbon group included in the substituent mentioned above may be either linear, branched, or cyclic.

The substituent, which a phenyl group, a polycyclic aromatic hydrocarbon group, or an aromatic heterocyclic group has, is preferably an alkyl group having 1 to 12 carbon atoms, an aryl group having 1 to 12 carbon atoms, an alkoxy group having 1 to 12 carbon atoms, an aryloxy group having 1 to 12 carbon atoms, an arylamino group having 1 to 12 carbon atoms, and a halogen atom.

$R^2$ is preferably an optionally substituted phenyl group, an optionally substituted furyl group, or an optionally substituted thienyl group, since an imidazole compound represented by the formula (1) can be synthesized inexpensively and easily, and the imidazole compound has satisfactory solubility in water or an organic solvent.

In the formula (1), $R^3$ is an optionally substituted alkylene group. The substituent, which an alkylene group may have, is not particularly limited, without interfering with the object of the present invention. Specific examples of the substituent, which an alkylene group may have, include a hydroxy group, an alkoxy group, an amino group, a cyano group, a halogen atom, and the like. The alkylene group may be either a linear alkylene group or a branched alkylene group, and is preferably a linear alkylene group. The number of carbon atoms of the alkylene group is not particularly limited, but is preferably 1 to 20, more preferably 1 to 10, and still more preferably 1 to 5. Note that the number of carbon atoms of the alkylene group does not include the number of carbon atoms of the substituent bonded to an alkylene group.

The alkoxy group as the substituent bonded to the alkylene group may be either a linear alkoxy group or a branched alkoxy group. The number of carbon atoms of the alkoxy group as the substituent is not particularly limited, but is preferably 1 to 10, more preferably 1 to 6, and particularly preferably 1 to 3.

The amino group as the substituent bonded to the alkylene group may be a monoalkylamino group or a dialkylamino group. The alkyl group included in the monoalkylamino group or dialkylamino group may be either a linear alkyl group or a branched alkyl group. The number of carbon atoms of the alkyl group included in the monoalkylamino group or dialkylamino group is not particularly limited, but is preferably 1 to 10, more preferably 1 to 6, and particularly preferably 1 to 3.

Specific examples of the alkylene group suitable as $R^3$ include a methylene group, an ethane-1,2-diyl group, an n-propane-1,3-diyl group, an n-propane-2,2-diyl group, an n-butane-1,4-diyl group, an n-pentane-1,5-diyl group, an n-hexane-1,6-diyl group, an n-heptane-1,7-diyl group, an n-octane-1,8-diyl group, an n-nonane-1,9-diyl group, an n-decane-1,10-diyl group, an n-undecane-1,11-diyl group, an n-dodecane-1,12-diyl group, an n-tridecane-1,13-diyl group, an n-tetradecane-1,14-diyl group, an n-pentadecane-1,15-diyl group, an n-hexadecane-1,16-diyl group, an n-heptadecane-1,17-diyl group, an n-octadecane-1,18-diyl group, an n-nonadecane-1,19-diyl group, and an n-icosane-1,20-diyl group.

$R^4$ is a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group, and n is an integer of 0 to 3. When n is an integer of 2 to 3, plural $R^4$(s) may be the same or different.

When R⁴ is an organic group, the organic group is the same as an organic group, which an aromatic group may have as a substituent, as for R².

When R⁴ is an organic group, the organic group is preferably an alkyl group, an aromatic hydrocarbon group, and an aromatic heterocyclic group. The alkyl group is preferably a linear or branched alkyl group having 1 to 8 carbon atoms, and more preferably a methyl group, an ethyl group, an n-propyl group, and an isopropyl group. The aromatic hydrocarbon group is preferably a phenyl group, a naphthyl group, a biphenylyl group, an anthryl group, and a phenanthrenyl group, more preferably a phenyl group and a naphthyl group, and particularly preferably a phenyl group. The aromatic heterocyclic group is preferably a pyridyl group, a furyl group, a thienyl group, an imidazolyl group, a pyrazolyl group, an oxazolyl group, a thiazolyl group, an isoxazolyl group, an isothiazolyl group, a benzoxazolyl group, a benzothiazolyl group, and a benzoimidazolyl group, and more preferably a furyl group and a thienyl group.

When R⁴ is an alkyl group, the position of the alkyl group bonding on an imidazole ring is preferably any one of 2-, 4-, and 5-positions, and more preferably 2-position. When R⁴ is an aromatic hydrocarbon group and an aromatic heterocyclic group, the position of these groups bonding on imidazole is preferably 2-position.

Among imidazole compounds represented by the formula (1), a compound represented by the following formula (1-1) is preferable, and a compound represented by the formula (1-1), in which R³ is a methylene group, is more preferable, since these compounds can be synthesized inexpensively and easily, and have excellent solubility in water or an organic solvent.

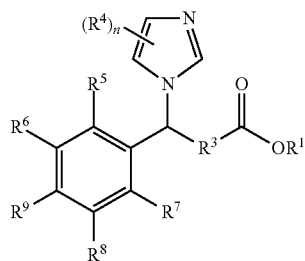

(1-1)

In the formula (1-1), $R^1$, $R^3$, $R^4$, and n are the same as those defined in the formula (1); and $R^5$, $R^6$, $R^7$, $R^8$, and $R^9$ are each independently a hydrogen atom, a halogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group, provided that at least one of $R^5$, $R^6$, $R^7$, $R^8$, and $R^9$ is a group other than a hydrogen atom.

When $R^5$, $R^6$, $R^7$, $R^8$, and $R^9$ are organic groups, the organic group is the same as an organic group, which $R^2$ in the formula (1) has as a substituent. $R^5$, $R^6$, $R^7$, and $R^8$ are preferably hydrogen atoms in view of solubility of an imidazole compound in solvent.

Among these, at least one of $R^5$, $R^6$, $R^7$, $R^8$, and $R^9$ is preferably the following substituent; and $R^9$ is particularly preferably the following substituent. When $R^9$ is the following substituent, $R^5$, $R^6$, $R^7$, and $R^8$ are preferably hydrogen atom. —O—$R^{10}$ ($R^{10}$ is a hydrogen atom or an organic group.)

When $R^{10}$ is an organic group, the organic group is the same as an organic group, which $R^2$ in the formula (1) has as a substituent. $R^{10}$ is preferably an alkyl group, more preferably, an alkyl group having 1 to 8 carbon atoms, particularly preferably an alkyl group having 1 to 3 carbon atoms, and most preferably a methyl group.

Among the compounds represented by the formula (1-1) mentioned above, a compound represented by the following formula (1-1-1) is preferable.

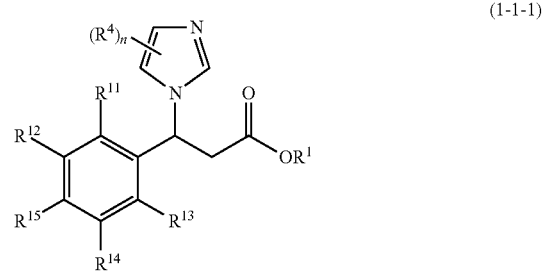

(1-1-1)

In the formula (1-1-1), $R^1$, $R^4$, and n are the same as those defined in the formula (1); and $R^{11}$, $R^{12}$, $R^{13}$, $R^{14}$, and $R^{15}$ are each independently a hydrogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group, provided that at least one of $R^{11}$, $R^{12}$, $R^{13}$, $R^{14}$, and $R^{15}$ is a group other than a hydrogen atom.

Among the compounds represented by the formula (1-1-1), at least one of $R^{11}$, $R^{12}$, $R^{13}$, $R^{14}$, and $R^{15}$ is preferably represented by the above-mentioned —O—$R^{10}$; and $R^{15}$ is particularly preferably a group represented by —O—$R^{10}$. When $R^{15}$ is a group represented by —O—$R^{10}$, $R^{11}$, $R^{12}$, $R^{13}$, and $R^{14}$ are preferably hydrogen atoms.

The method for synthesizing the above-mentioned imidazole compound represented by the formula (1) is not particularly limited. For example, imidazolylation is performed by reacting a halogen-containing carboxylic acid derivative represented by the following formula (I) with an imidazole compound represented by the following formula (II) in accordance with a conventional method, thereby making it possible to synthesize the above-mentioned imidazole compound represented by the formula (1).

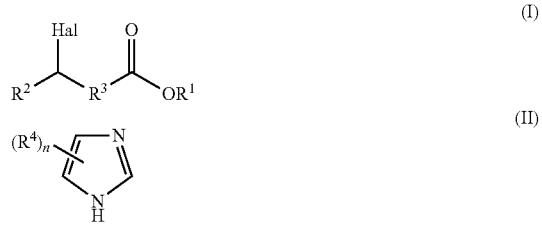

In the formulas (I) and (II), $R^1$, $R^2$, $R^3$, $R^4$, and n are the same as those defined in the formula (1). In the formula (I), Hal is a halogen atom.

When the imidazole compound is a compound represented by the formula (1) in which $R^3$ is a methylene group, that is, the imidazole compound is a compound represented by the following formula (1-2), it is also possible to synthesize the imidazole compound by the Michael addition reaction which will be described below.

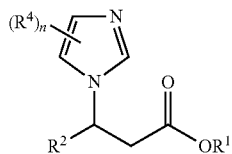
(1-2)

In the formula (1-2), $R^1$, $R^2$, $R^4$, and n are the same as those defined in the formula (1).

Specifically, for example, a 3-substituted acrylic acid derivative represented by the following formula (III) is mixed with an imidazole compound represented by the above-mentioned formula (II) in a solvent to cause a Michael addition reaction, thereby obtaining an imidazole compound represented by the above-mentioned formula (1-2).

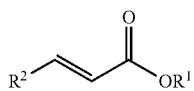
(III)

In the formula (III), $R^1$ and $R^2$ are the same as those defined in the formula (1).

3-Substituted acrylic acid derivative having an imidazolyl group represented by the following formula (IV) is added in a solvent containing water, thereby obtaining an imidazole compound represented by the following formula (1-3).

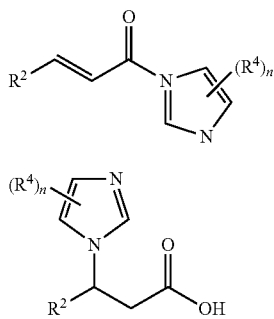
(IV)

(1-3)

In the formulas (IV) and (1-3), $R^2$, $R^4$, and n are the same as those defined in the formula (1).

In this case, hydrolysis of the above-mentioned 3-substituted acrylic acid derivative represented by the formula (IV) leads to production of the above-mentioned imidazole compound represented by the formula (II) and 3-substituted acrylic acid represented by the following formula (V). Then, the Michael addition reaction occurs between the 3-substituted acrylic acid represented by the following formula (V) and the above-mentioned imidazole compound represented by the formula (II) to produce the above-mentioned imidazole compound represented by the formula (1-3).

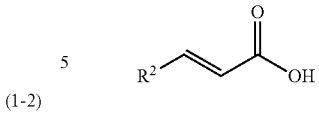
(V)

In the formula (V), $R^2$ is the same as those defined in the formula (1).

Suitable specific examples of the imidazole compound represented by the formula (1) include the following.

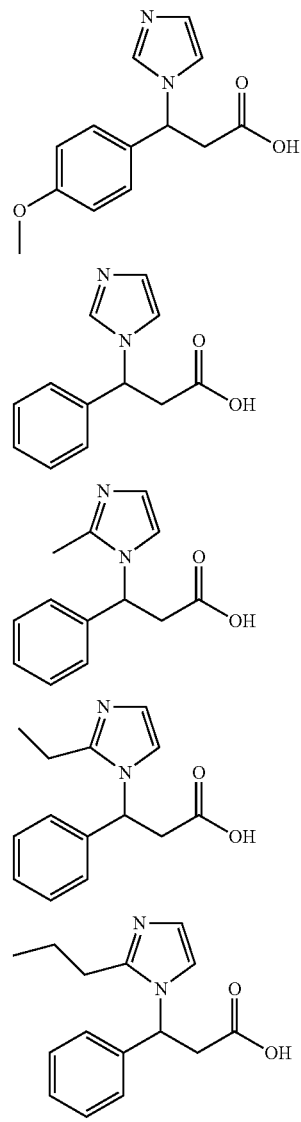

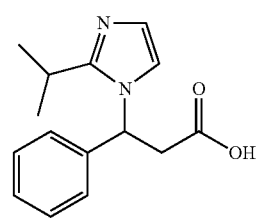

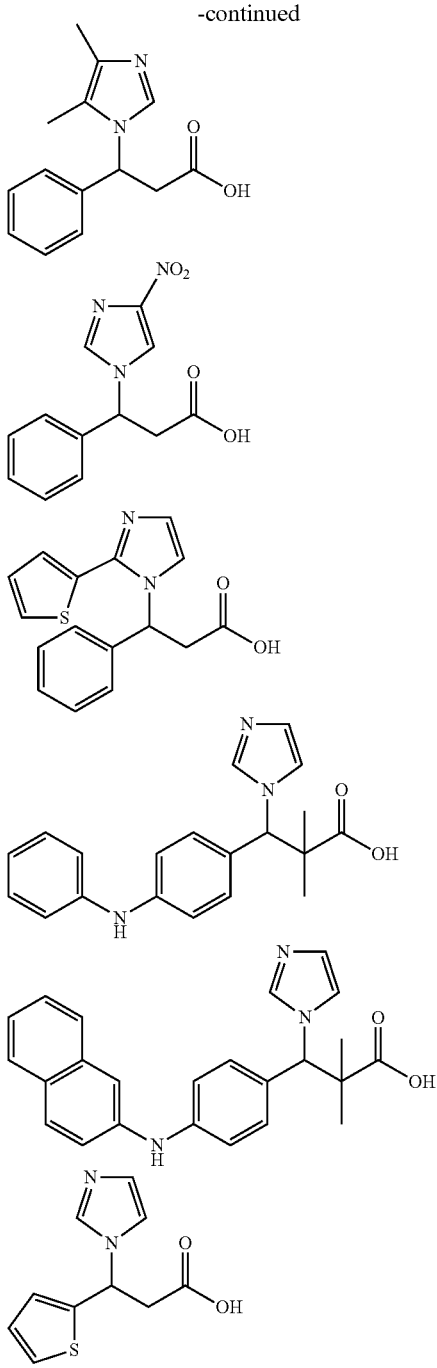

There is no particular limitation on the content of a (B) imidazole compound in the curable composition as long as the object of the present invention is not impaired. The content of the (B) imidazole compound in the curable composition is preferably 0.1 to 20% by mass, more preferably 0.2 to 15% by mass, particularly preferably 0.5 to 10% by mass, and most preferably 1 to 7% by mass, based on the total of the mass of components other than the (S) solvent in the curable composition.

<(C) Crosslinking Agent>

The curable composition may include a (C) crosslinking agent. The (C) crosslinking agent is at least one selected from the group consisting of a polyfunctional amine compound and a polyfunctional carboxylic anhydride. The (C) crosslinking agent reacts with an epoxy group possessed by the (A) epoxy compound to allow the (A) epoxy compound to undergo intramolecular crosslinking, thus curing a curable composition. Mixing of the (C) crosslinking agent in the curable composition enables more satisfactory curing of the curable composition. The polyfunctional amine compound and the polyfunctional carboxylic anhydride can be used by appropriately selecting from the polyfunctional amine compound and the polyfunctional carboxylic anhydride which have conventionally been used as a curing agent of an epoxy compound. The polyfunctional amine compound and the polyfunctional carboxylic anhydride will be described below.

[Polyfunctional Amine Compound]

There is no particular limitation on the polyfunctional amine compound as long as it can react with the (A) epoxy compound to form a cured article. The polyfunctional amine compound may be either a compound capable of reacting with the (A) epoxy compound as it is, or a so-called latent curing agent capable of reacting with the (A) epoxy compound in a state of being activated by heating. Suitable examples of the polyfunctional amine compound include aromatic diamine, guanidine, substituted guanidine, biguanidine, substituted biguanidine, substituted urea, melamine resin, and guanamine derivative.

Suitable specific examples of the aromatic diamine include o-phenylenediamine, m-phenylenediamine, p-phenylenediamine, 3,3'-diaminodiphenyl ether, 3,4'-diaminodiphenyl ether, 4,4'-diaminodiphenyl ether, 3,3'-diaminodiphenylmethane, 3,4'-diaminodiphenylmethane, 4,4'-diaminodiphenyl ether methane, bis(4-amino-3,5-dimethylphenyl)methane, bis(4-amino-3,5-diisopropylphenyl)methane, 3,3'-diaminodiphenyldifluoromethane, 3,4'-diaminodiphenyldifluoromethane, 4,4'-diaminodiphenyldifluoromethane, 3,3'-diaminodiphenyl sulfone, 3,4'-diaminodiphenyl sulfone, 4,4'-diaminodiphenyl sulfone, 3,3'-diaminodiphenyl sulfide, 3,4'-diaminodiphenyl sulfide, 4,4'-diaminodiphenyl sulfide, 3,3'-diaminodiphenylketone, 3,4'-diaminodiphenylketone, 4,4'-diaminodiphenylketone, 2,2-bis(3-aminophenyl)propane, 2-(3-aminophenyl)-2-(4-aminophenyl)propane, 2,2-bis(4-aminophenyl)propane, and the like.

The substituted guanidine is a compound in which hydrogen atoms to be combined with nitrogen atoms included in guanidine are substituted with an organic group. The organic group may have heteroatoms such as N, O, S, P, and halogen atoms. The organic group to be combined with nitrogen atoms possessed by the substituted guanidine is preferably a hydrocarbon group or a cyano group. The hydrocarbon group is preferably an alkyl group, more preferably an alkyl group having 1 to 6 carbon atoms, and still more preferably a methyl group.

Suitable specific examples of the substituted guanidine include methylguanidine, dimethylguanidine, trimethylguanidine, tetramethylguanidine, and dicyandiamide. Of these, dicyandiamide is preferable.

The substituted biguanidine is a compound in which hydrogen atoms to be combined with nitrogen atoms included in biguanidine are substituted with an organic group. The organic group may have heteroatoms such as N, O, S, P, and halogen atoms. The organic group to be combined with nitrogen atoms possessed by the substituted biguanidine is preferably a hydrocarbon group or a cyano group. The hydrocarbon group is preferably an alkyl group, more preferably an alkyl group having 1 to 6 carbon atoms, and still more preferably a methyl group.

Suitable specific examples of the substituted biguanidine include methyl biguanidine, dimethyl biguanidine, tetramethyl biguanidine, hexamethyl biguanidine, and heptamethyl biguanidine.

The substituted urea is a compound in which hydrogen atoms to be combined with nitrogen atoms included in urea are substituted with an organic group. The organic group may have heteroatoms such as N, O, S, P, and halogen atoms. The substituted urea may be a urea dimer represented by the following formula (C1):

$$X^1X^2N-CO-NX^3-X^7-NX^6-CO-NX^4X^5 \qquad (C1)$$

wherein, in the formula (C1), $X^1$ to $X^6$ each independently represents a hydrogen atom or an organic group, and $X^7$ is a divalent organic group.

Suitable specific examples of the substituted urea include N,N-dimethyl-N'-(3-chloro-4-methylphenyl)urea, N,N-dimethyl-N'-(4-chlorophenyl)urea, N,N-dimethyl-N'-(3,4-dichlorophenyl)urea, N,N-dimethyl-N'-phenylurea, 2,4-bis(N',N'-dimethylureide)toluene, 1,4-bis(N',N'-dimethylureide)benzene, dimethylpropyleneurea, and 1,3-hydroxymethylurea.

Suitable specific examples of the guanamine derivative include an alkylated benzoguanamine resin, a benzoguanamine resin, and a methoxymethylethoxymethylbenzoguanamine resin.

Of the above-described polyfunctional amine compounds to be used as the (C) crosslinking agent, one or more compounds selected from the group consisting of guanidine, substituted guanidine, and aromatic diamine are preferable.

[Polyfunctional Carboxylic Anhydride]

The polyfunctional carboxylic anhydride can be used by appropriately selecting from various acid anhydride compounds which have conventionally been used as a curing agent for epoxy resin. Specific examples of the polyfunctional carboxylic anhydride include maleic anhydride, tetrahydrophthalic anhydride, hexahydrophthalic anhydride, 4-methylhexahydrophthalic anhydride, hexahydrotrimellitic anhydride, phthalic anhydride, trimellitic anhydride, pyromellitic dianhydride, 3,3',4,4'-biphenyltetracarboxylic dianhydride, and a styrene-maleic anhydride copolymer. When the solvent is not separately used, the polyfunctional carboxylic anhydride is preferably a compound which is liquid at room temperature.

The content of the (C) crosslinking agent in the curable composition is preferably 20% by mass or less, more preferably 0.1 to 20% by mass, and still more preferably 0.1 to 10% by mass, based on the total of the mass of components other than the (S) solvent in the curable composition.

<(D) Curing Accelerator>

The curable composition may contain a (D) curing accelerator. Suitable examples of the curing accelerator include an oxime ester compound, an α-aminoalkylphenone-based compound, an acylphosphine oxide-based compound, and an imidazole compound.

The oxime ester compound is not particularly limited as long as it is a compound in which two organic groups are combined through an oxime ester bond represented by =N—O—CO—. Suitable oxime ester compounds include the following compounds.

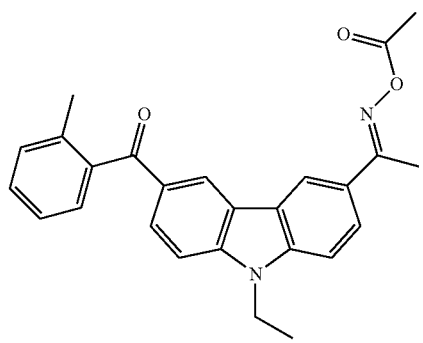

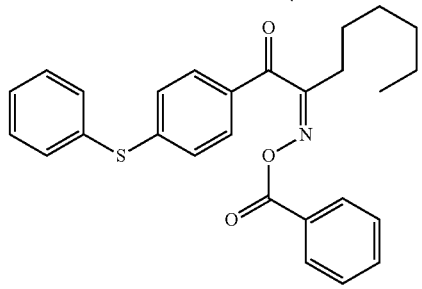

Specific examples of the α-aminoalkylphenone-based compound include 2-methyl-1-(4-methylthiophenyl)-2-morpholinopropan-1-one, 2-benzyl-2-dimethylamino-1-(4-morpholinophenyl)-butanone-1, and 2-(dimethylamino)-2-[(4-methylphenyl)methyl]-1-[4-(4-morpholinyl)phenyl]-1-butanone.

Specific examples of the acylphosphine oxide-based compound include 2,4,6-trimethylbenzoyl-diphenyl-phosphine oxide and bis(2,4,6-trimethylbenzoyl)-phenylphosphine oxide.

Specific examples of the imidazole compound include 1-cyanoethyl-2-phenylimidazole, 2,4-diamino-6-[2'-methylimidazolyl-(1')]-ethyl-s-triazineisocyanuric acid adduct (2MA-OK, manufactured by SHIKOKU CHEMICALS CORPORATION), 2,4-diamino-6-[2'-methylimidazolyl-(1')]-ethyl-s-triazine (2MZ-A, manufactured by SHIKOKU CHEMICALS CORPORATION), 2-phenyl-4,5-dihydroxymethylimidazole (2PHZ, manufactured by SHIKOKU CHEMICALS CORPORATION), 2-phenyl-4-methyl-5-hydroxymethylimidazole (2P4MHZ, manufactured by SHIKOKU CHEMICALS CORPORATION), and the like.

Of the above (D) curing accelerators, an oxime ester compound, an α-aminoalkylphenone-based compound, and an acylphosphine oxide-based compound may be used together with an auxiliary capable of further enhancing the curing acceleration effect.

Specific examples of the auxiliary include benzophenones such as benzophenone, 3-hydroxybenzophenone, 4-hydroxybenzophenone, 4,4-dihydroxybenzophenone, 2-methylbenzophenone, 3-methylbenzophenone, 4-methylbenzophenone, 2,5-dimethylbenzophenone, 3,4-dimethylbenzophenone, 4-methoxybenzophenone, 4,4-dimethoxybenzophenone, 3,3-dimethyl-4-methoxybenzophenone, and 4-phenylbenzophenone; acetophenones such as acetophenone, 4-methoxyacetophenone, 2,4-dimethoxyacetophenone, 2,5-dimethoxyacetophenone, 2,6-dimethoxyacetophenone, 4,4-dimethoxyacetophenone, 4-ethoxyacetophenone, diethoxyacetophenone, 2,2-diethoxyacetophenone, 2-ethoxy-2-phenylacetophenone, and 4-phenylacetophenone; anthraquinones such as anthraquinone, hydroxyanthraquinone, 1-nitroanthraquinone, aminoanthraquinone, 2-chloroanthraquinone, 2-methylanthraquinone, 2-ethylanthraquinone, anthraquinonesulfonic acid, 1,2-benzanthraquinone, and 1,4-hydroxyanthraquinone (quinizarin); anthracenes such as anthracene, 1,2-benzoanthracene, 9-cyanoanthracene, 9,10-dicyanoanthracene, 2-ethyl-9,10-dimethoxyanthracene, and 9,10-bis(phenylethyl)anthracene; quinones such as 2,3-dichloro-6-dicyano-p-benzoquinone, 2,3-dimethoxy-5-methyl-1,4-benzoquinone, methoxybenzoquinone, 2,5-dichloro-p-benzoquinone, 2,6-dimethyl-1,4-benzoquinone, 9,10-phenanthrenequinone, camphor quinone, 2,3-dichloro-1,4-naphthoquinone, and xanthone; thioxanes such as thioxanthone, 2-methylthioxanthone, 2,4-dimethylthioxanthone, isopropylthioxanthone, 2,4-diethylthioxanthone, and 2,4-isopropylthioxanthone; cycloheptanes such as dibezosuberone, dibenzosuberene, dibenzosuberenol, and dibenzosuberane; aromatic compounds such as 2-methoxynaphthalene, benzoin isopropyl ether, 4-benzoyldiphenyl, o-benzoylbenzoic acid, methyl o-benzoylbenzoate, 4-benzoyl-4-methyl-diphenyl sulfide, benzyl, and benzoinmethyl ether; and pigment compounds such as coumarins, thiazines, azines, acridines, and xanthenes.

The content of the (D) curing accelerator in the curable composition is preferably 0.1 to 10% by mass, and more preferably 0.1 to 5% by mass, based on the total of the mass of components other than the (S) solvent in the curable composition. When the auxiliary is used together with the (D) curing accelerator, the content of the auxiliary in the curable composition is preferably 0.1 to 10% by mass, and more preferably 0.1 to 5% by mass, based on the total of the mass of components other than the (S) solvent in the curable composition.

<(E) Other Components>

If necessary, it is possible to allow the curable composition to contain additives, for example, a filler such as a rubber particle, a surfactant, a thermal polymerization inhibitor, a defoamer, a silane coupling agent, and the like. It is possible to use any conventionally known additives. Examples of the surfactant include anionic, cationic, and nonionic compounds; examples of the thermal polymerization inhibitor include hydroquinone, hydroquinone monoethyl ether, and the like; and examples of the defoamer include silicone-based and fluorine-based compounds.

<(S) Solvent>

The curable composition may include a (S) solvent so as to improve coatability and to adjust viscosity.

Specific examples of the (S) solvent include (poly)alkylene glycol monoalkyl ethers such as ethylene glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether; (poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate (PGMEA), and propylene glycol monoethyl ether acetate; other ethers such as diethylene glycol dimethyl ether, diethylene glycol methyl ethyl ether, diethylene glycol diethyl ether, and tetrahydrofuran; ketones such as acetone, methyl ethyl ketone, cyclohexanone, 2-heptanone, and 3-heptanone; lactic acid alkyl esters such as methyl 2-hydroxypropionate and ethyl 2-hydroxypropionate; other esters such as ethyl 2-hydroxy-2-methylpropionate, methyl 3-methoxypropionate, ethyl 3-methoxypropionate, methyl 3-ethoxypropionate, ethyl 3-ethoxypropionate, ethoxyethyl acetate, hydroxyethyl acetate, methyl 2-hydroxy-3-methylbutanoate, 3-methoxybutyl acetate, 3-methyl-3-methoxybutyl acetate, 3-methyl-3-methoxybutylpropionate, ethyl acetate, n-propyl acetate, i-propyl acetate, n-butyl acetate, i-butyl acetate, n-pentyl formate, i-pentyl acetate, n-butyl propionate, ethyl butyrate, n-propyl butyrate, i-propyl butyrate, n-butyl butyrate, methyl pyruvate, ethyl pyruvate, n-propyl pyruvate, methyl acetoacetate, ethyl acetoacetate, and ethyl 2-oxobutanoate; aromatic hydrocarbons such as toluene and xylene; amides such as N-methylpyrrolidone, N,N-dimethylformamide, and N,N-dimethylacetamide; and the like. Of these solvents, alkylene glycol monoalkyl ethers, alkylene glycol monoalkyl ether acetates, the above-mentioned other ethers, lactic acid alkyl esters, and the above-mentioned other esters are preferable, and alkylene glycol monoalkyl ether acetates, the above-mentioned other ethers, and the above-mentioned other esters are more preferable.

There is no particular limitation on the content of the (S) solvent in the curable composition. The content of the (S) solvent in the curable composition is appropriately adjusted in consideration of handleability of the curable composition, such as coatability. Typically, the concentration of components other than the (S) solvent in the curable composition is preferably 10% by mass or more, more preferably 15% by mass or more, and particularly preferably 20% by mass or more.

<<Method for Producing Curable Composition>>

A curable composition can be produced by uniformly mixing the above-described components in a predetermined ratio. When the curable composition includes the above-mentioned components (B) and (C), a curable composition may be produced by preparing a curing agent mixture composition including components (B) and (C) and then uniformly mixing the curing agent mixture composition with other components. The curing agent mixture composition may include a solvent for the purpose of adjusting the viscosity. It is possible to use, as the solvent, a solvent which can be used as the (S) component. The curing agent mixture composition will be described in detail below. Examples of the mixer usable in the production of the curable composition include a two-roll mill, a three-roll mill, and the like. In order to cure the curable composition containing the above-described components at a low temperature of about 130° C. within a short time, a mixing operation in the case of preparing the curable composition is preferably performed at room temperature to about 40° C. When the curable composition has sufficiently low viscosity, if necessary, the curable composition may be filtered using a filter having a desired hole size so as to remove insoluble foreign substances.

The curable composition thus produced is curable at a low temperature within a short time, and also exhibits a long pot life. Such a curable composition satisfactorily adheres to various materials, and therefore it can be suitably used in various applications similar to a conventional curable composition containing an epoxy compound.

<<Curing Method of Curable Composition>>

There is no particular limitation on temperature and time in the case of curing the above-described curable composition as long as curing sufficiently proceeds, and the above-mentioned curable composition is curable at a low temperature within a short time. Specifically, the curable composition is cured at a temperature of about 100 to 160° C. for about 3 to 10 minutes. The curable composition is curable at a low temperature, but can also be cured at a high temperature. There is no particular limitation on the curing temperature of the curable composition as long as it is a temperature at which neither thermal decomposition of components contained in the curable composition, nor volatilization or sublimation of components other than the (S) solvent occurs.

<<Adhesive>>

The above-described curable composition contains an (A) epoxy compound which has conventionally been blended in various adhesives, and is therefore satisfactorily usable as an adhesive for adhesion of various materials. A method for use of the adhesive is the same as that of a conventional adhesive containing an epoxy compound. Specific adhesion methods include a method in which an adhesive is applied or injected at least one predetermined place in plural adherends, and plural adherends are fixed in a desired state, followed by heating.

As mentioned above, a cured article of the curable composition satisfactorily adheres to various materials. Therefore, the above-described curable composition can also be used as a sealing material of electronic components, for example, various semiconductor elements.

<<Fiber-Reinforced Composite Material>>

The above-described curable composition can be suitably used as a material for formation of a matrix in a fiber-reinforced composite material comprising a matrix and a reinforcing fiber.

The reinforcing fiber is not particularly limited as long as it has conventionally been used in the production of a fiber-reinforced composite material. The reinforcing fiber may be a twisted yarn, an untwisting yarn, or an untwisted yarn, and is preferably an untwisting yarn or an untwisted yarn in view of moldability and mechanical strength of the fiber-reinforced composite material.

There is no particular limitation on the form of the reinforcing fiber. Short fibers of the reinforcing fiber may be dispersed in a matrix, or long fibers aligned in one direction of the reinforcing fiber or a woven fabric or a nonwoven fabric of the reinforcing fiber may be coated with a matrix. When the reinforcing fiber is a woven fabric, a weaving method thereof can be freely selected from a plain weave, satin weave, and the like according to application sections and applications.

Examples of the reinforcing fiber include a carbon fiber, a glass fiber, an aramid fiber, a boron fiber, an alumina fiber, a silicon carbide fiber, and the like in view of mechanical strength and durability of the fiber-reinforced composite material. Two or more reinforcing fibers may be used in combination. Of these reinforcing fibers, a carbon fiber is preferable because of particularly excellent strength of the fiber-reinforced composite material. It is possible to use, as the carbon fiber, polyacrylonitrile-based, pitch-based, and rayon-based carbon fibers. Of these carbon fibers, a polyacrylonitrile-based carbon fiber is preferable.

The volume content of the reinforcing fiber in the fiber-reinforced composite material comprising a matrix and a reinforcing fiber is appropriately selected in accordance with the strength or shape of the fiber-reinforced composite material. Typically, the volume content is preferably 40 to 85% by volume, and more preferably 50 to 70% by volume.

There is no particular limitation on a method for producing a fiber-reinforced composite material. After impregnating a reinforcing fiber with a curable composition in accordance with a known method, the curable composition is cured under predetermined conditions, thus producing a fiber-reinforced composite material. Since the curable composition is cured at a low temperature within a short time, it is possible to produce a fiber-reinforced composite material in a high cycle manner by using the above curable composition while reducing energy required for curing.

<<Curing Agent Mixture Composition>>

A curing agent mixture composition includes a (B) imidazole compound represented by the following formula (1) (component (B)) and (C) at least one crosslinking agent selected from the group consisting of a polyfunctional amine compound and a polyfunctional carboxylic anhydride (component (C)). It is possible to obtain a curable composition, which is curable at a low temperature within a short time, and also exhibits a long pot life, by mixing such a curing agent composition in the above-mentioned (A) epoxy compound, or a composition containing the (A) epoxy compound. When preparing a curable composition, two or more curing agent mixture compositions may be used in combination.

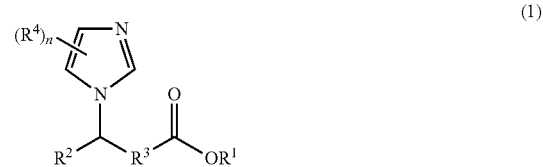

In the formula (1), $R^1$ is a hydrogen atom or an alkyl group; $R^2$ is an optionally substituted aromatic group; $R^3$ is an optionally substituted alkylene group; $R^4$ is a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group; and n is an integer of 0 to 3.

The (B) imidazole compound represented by the following formula (1) and (C) at least one crosslinking agent selected from the group consisting of a polyfunctional amine compound and a polyfunctional carboxylic anhydride are as mentioned as the components of the curable composition. There is no particular limitation on a mass ratio of the component (B) to the component (C) in the curing agent mixture composition, and mass of the component (B): mass of the component (C) is preferably 0.1:99.9 to 99.9:0.1, and more preferably 0.5:99.5 to 99.5:0.5.

If necessary, the curing agent mixture composition may include the above-mentioned (D) curing accelerator (component (D)) or (E) other component (component (E)). Each content of the (D) curing accelerator or (E) other component in the curing agent mixture composition is appropriately determined, taking the composition of the curable composition prepared using the curing agent mixture composition into consideration.

The curing agent mixture composition may include the above-mentioned (S) solvent. When the curing agent mixture composition includes the (S) solvent, the curing agent mixture composition may be in the form of a solution or a slurry (paste). In view of uniformity of the curing agent mixture composition, the curing agent mixture composition is preferably in the form of a solution. There is no particular limitation on the content of the (S) solvent in the curing agent mixture composition. When including the (S) solvent, the content of the (S) solvent in the curing agent mixture composition is preferably 0.1 to 99% by mass, more preferably 1 to 95% by mass, and particularly preferably 10 to 80% by mass.

There is no particular limitation on the method for preparing a curing agent mixture composition. When the curing agent mixture composition does not contain the (S) solvent, typically, a powder of a component (B), a powder of component (C) and, optionally, a powder of a component (D) and/or a powder of a component (E) are mixed to prepare a curing agent mixture composition. It is possible to use, as a powder mixer which can be used to prepare a curing agent mixture composition, known powder mixers such as a planetary mixer, a ribbon blender, a Lodige mixer, a Henschel mixer, a rocking mixer, and a Nauta mixer (registered trademark).

When the component (B), the component (C), the component (D), or the component (E) has a melting point lower than a thermal decomposition temperature, melts or melts and powders may be mixed together. In this case, mixing of components of the curing agent mixture composition is performed at a temperature lower than the lowest thermal decomposition temperature of thermal decomposition temperatures of components included in the curing agent mixture composition.

When the curing agent mixture composition includes a (S) solvent, for example, after adding a component other than the (S) solvent to the (S) solvent, these components are uniformly mixed, thus enabling preparation of a curing agent mixture composition. When mixing components of the curing agent composition including a (S) solvent, components may be heated to a temperature range where components of the curing agent mixture composition are not thermally decomposed. Alternatively, a curing agent mixture composition may be prepared in advance at a low solid component concentration (for example, 1 to 30% by mass), followed by concentration through vaporization of the solvent.

EXAMPLES

The present invention will be described in more detail by way of Examples. The present invention is not limited to the scope of Examples.

Examples 1 to 15 and Comparative Examples 1 to 4

In Examples and Comparative Examples, the following (A) epoxy compounds, EP1 to EP6, were used as the component (A). Regarding EP-6, the numeral placed at the lower right part of parentheses in each repeating unit represents the content (% by mass) of each unit in an epoxy group-containing resin, EP-6. A weight average molecular weight is 7,000.

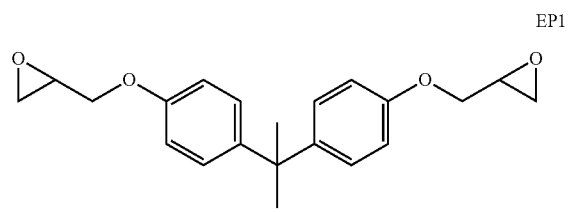

EP1

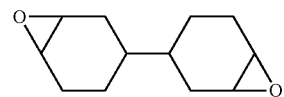

EP2

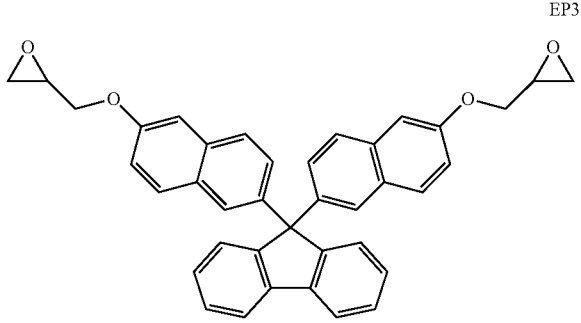

EP3

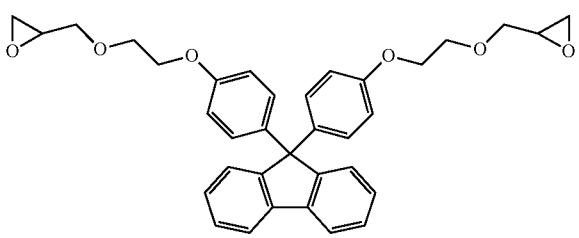

EP4

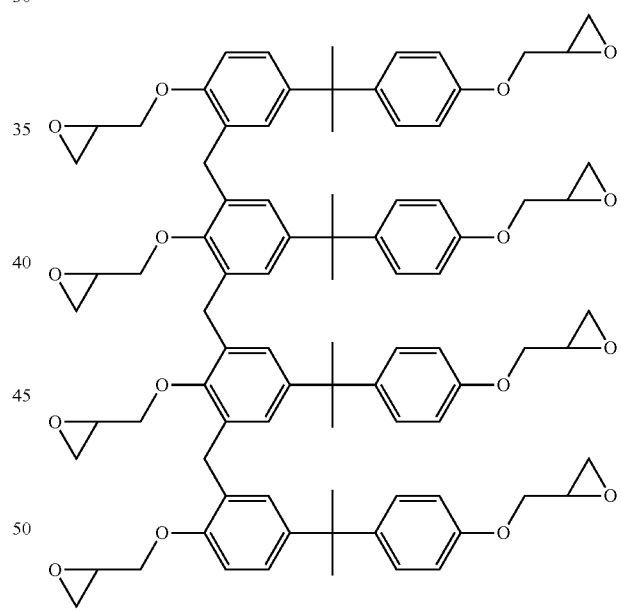

EP5

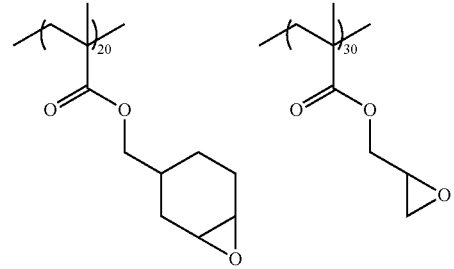

EP6

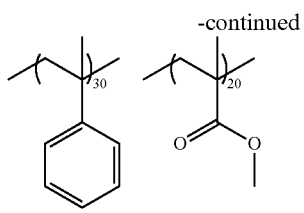

In Examples, the following B1, which is an imidazole compound represented by the formula (1), was used as the component (B).

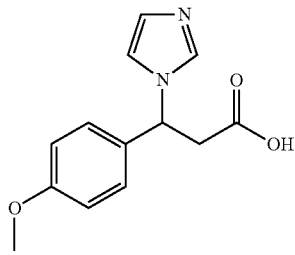

Preparation Example 1

The above-mentioned B1 was synthesized in accordance with the following procedure. First, 30 g of a compound of the below-mentioned formula was dissolved in 200 g of methanol, and then 7 g of potassium hydroxide was added in methanol. Next, the methanol solution was stirred at 40° C. Methanol was distilled off and the residue was suspended in 200 g of water. In the suspension thus obtained, 200 g of tetrahydrofuran was mixed, followed by stirring and further separation of the aqueous phase. Under ice cooling, 4 g of hydrochloric acid was added. After stirring, 100 g of ethyl acetate was mixed, followed by stirring. After the mixed solution was left to stand, the oil phase was isolated. The object was crystallized from the oil phase and the precipitate was recovered to obtain B1 having the above-mentioned structure.

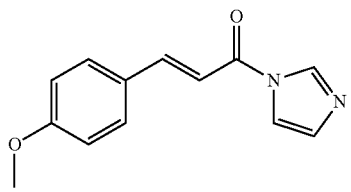

The results of the measurement of $^1$H-NMR of B1 are as follows.

$^1$H-NMR (DMSO): 11.724 (s, 1H), 7.838 (s, 1H), 7.340 (d, 2H, J=4.3 Hz), 7.321 (d, 1H, J=7.2 Hz), 6.893 (d, 2H, J=4.3 Hz), 6.876 (d, 1H, J=6.1 Hz), 5.695 (dd, 1H, J=4.3J, 3.2J), 3.720 (s, 3H), 3.250 (m, 2H)

In Comparative Examples, the following B2 and B3, which are analogous components of an imidazole compound represented by a structure of the formula (1), were used as the component (B).

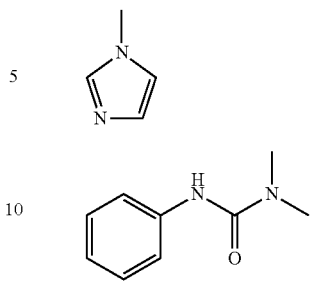

In Examples and Comparative Examples, the following CA1 to CA4 were used as the (C) crosslinking agent.
CA1: Dicyandiamide
CA2: 4,4'-Diaminodiphenyl ether
CA3: Tetrahydrophthalic anhydride
CA4: 3,3',4,4'-Biphenyltetracarboxylic dianhydride Regarding Examples 1 to 5, Example 10, Example 11, and Comparative Examples 1 to 4, a component (A), a component (B), and a component (C), whose type and amount are shown in Table 1, were uniformly mixed to obtain curable compositions using a three-roll mill. Regarding Examples 6 to 9 and Examples 12 to 15, a component (A), a component (B), and a component (C), whose type and amount are shown in Table 1, were dissolved in propylene glycol monomethyl ether acetate so as to adjust the solid component concentration to 25% by mass to obtain curable compositions.

Using the curable compositions thus obtained, curability at a low temperature and bottle stability were evaluated in accordance with the following procedures. These evaluation results are shown in Table 1.

<Evaluation of Low Temperature Curability>

A curable composition was injected into a space of 2 mm in width formed between two molds. A curable composition was injected into a space of 2 mm in width formed between two molds. The curable composition injected into the space was heated for 5 minutes and then the molds were removed to obtain a 2 mm thick plate-like specimen. Confirmation of whether a specimen reached a state in which a surface thereof is free from tackiness, and this was used as a guide of curing. Specimens cured at a heating temperature of lower than 140° C. were rated "Very Good", specimens cured at a heating temperature of 140° C. or higher and lower than 160° C. were rated "Good", and specimens requiring a heating temperature of higher than 160° C. were rated "Bad".

<Evaluation of Bottle Stability>

Viscosity (cP) of the curable composition immediately after preparation was measured using an E type viscometer (Model TV-20, corn plate type, manufactured by TOKI SANGYO CO., LTD.). The viscosity of the curable composition was measured after storage at 25° C. for 10 and 30 days. The case where the viscosity after storage for 10 days increased by 20 cP or more in comparison with initial viscosity was rated "Bad". The case where an increase in viscosity after storage for 10 days is less than 20 cP in comparison with initial viscosity, but the viscosity after storage for 30 days increased by 20 cP or more in comparison with initial viscosity was rated "Good". The case where the viscosity after storage for 30 days increased by less than 20 cP in comparison with initial viscosity was rated "Very Good".

TABLE 1

| | Type and amount of each component (Type/% by mass) | | | Dilution by solvent | Low temperature curability | Bottle stability |
|---|---|---|---|---|---|---|
| | (A) | (B) | (C) | | | |
| Ex. 1 | EP1/90 | B1/5 | CA1/5 | Not diluted | Very Good | Very Good |
| Ex. 2 | EP1/90 | B1/5 | CA2/5 | Not diluted | Good | Very Good |
| Ex. 3 | EP1/90 | B1/5 | CA3/5 | Not diluted | Very Good | Good |
| Ex. 4 | EP1/90 | B1/5 | CA4/5 | Not diluted | Very Good | Very Good |
| Ex. 5 | EP2/90 | B1/5 | CA1/5 | Not diluted | Very Good | Very Good |
| Ex. 6 | EP3/90 | B1/5 | CA1/5 | Diluted | Very Good | Very Good |
| Ex. 7 | EP4/90 | B1/5 | CA1/5 | Diluted | Very Good | Very Good |
| Ex. 8 | EP5/90 | B1/5 | CA1/5 | Diluted | Very Good | Very Good |
| Ex. 9 | EP6/90 | B1/5 | CA1/5 | Diluted | Very Good | Very Good |
| Ex. 10 | EP1/90 | B1/5 | — | Not diluted | Good | Good |
| Ex. 11 | EP2/90 | B1/5 | — | Not diluted | Good | Good |
| Ex. 12 | EP3/90 | B1/5 | — | Diluted | Good | Good |
| Ex. 13 | EP4/90 | B1/5 | — | Diluted | Good | Good |
| Ex. 14 | EP5/90 | B1/5 | — | Diluted | Good | Good |
| Ex. 15 | EP6/90 | B1/5 | — | Diluted | Good | Good |
| Comp. Ex. 1 | EP1/90 | B2/5 | CA1/5 | Not diluted | Good | Bad |
| Comp. Ex. 2 | EP1/90 | B3/5 | CA1/5 | Not diluted | Bad | Good |
| Comp. Ex. 3 | EP1/90 | B2/5 | — | Not diluted | Good | Bad |
| Comp. Ex. 4 | EP1/90 | B3/5 | — | Not diluted | Bad | Bad |

As is apparent from Examples 1 to 15, the curable compositions including an epoxy compound as a component (A), and an imidazole compound represented by the formula (1) as a component (B) are curable at a low temperature within a short time, and also exhibit a long pot life.

As is apparent from Comparative Examples 1 to 4, the curable compositions including an epoxy compound as the component (A) and an imidazole compound having a structure not included in the formula (1) as the component (B) cannot simultaneously satisfy a satisfactory effect at a low temperature within a short time and a long pot life.

As is apparent from Examples 1 to 9, when the curable compositions further include a (C) crosslinking agent, at least one of curability at a low temperature and pot life is particularly excellent.

The invention claimed is:

1. A curable composition comprising:
  an (A) epoxy compound; and
  a (B) imidazole compound represented by the following formula (1):

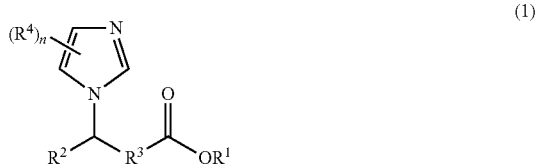

(1)

wherein, in the formula (1), $R^1$ is a hydrogen atom or an alkyl group; $R^2$ is an optionally substituted aromatic group; $R^3$ is an alkylene group having no substituent; $R^4$(s) each independently represents a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group; and n is an integer of 0 to 3.

2. The curable composition according to claim 1, comprising (C) at least one crosslinking agent selected from the group consisting of a polyfunctional amine compound and a polyfunctional carboxylic anhydride.

3. The curable composition according to claim 2, wherein the (C) crosslinking agent is guanidine, substituted guanidine, and/or aromatic diamine.

4. An adhesive comprising the curable composition according claim 1.

5. A method for producing a fiber-reinforced composite material comprising curing the curable composition according to claim 1, in which a reinforcing fiber is impregnated, by heating.

6. A fiber-reinforced composite material comprising: a matrix consisting of a cured article of the curable composition according to claim 1; and a reinforcing fiber.

7. The curable composition according to claim 1, wherein $R^3$ is a methylene group.

8. The curable composition according to claim 1, wherein n is 0.

9. The curable composition according to claim 1, wherein $R^1$ is a hydrogen atom.

10. A curing agent mixture composition comprising:
  a (B) imidazole compound represented by the following formula (1); and
  (C) at least one crosslinking agent selected from the group consisting of a polyfunctional amine compound and a polyfunctional carboxylic anhydride:

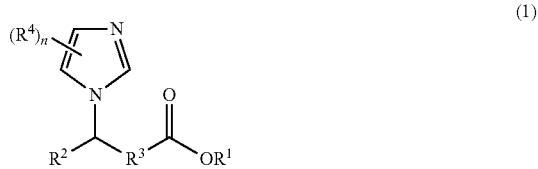

(1)

wherein, in the formula (1), $R^1$ is a hydrogen atom or an alkyl group; $R^2$ is an optionally substituted aromatic group; $R^3$ is an alkylene group having no substituent; $R^4$ each independently represents a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group; and n is an integer of 0 to 3.

11. The curing agent mixture composition according to claim 10, wherein $R^3$ is a methylene group.

12. The curing agent mixture composition according to claim 10, wherein n is 0.

13. The curing agent mixture composition according to claim 10, wherein $R^1$ is a hydrogen atom.

* * * * *